United States Patent
Kurihara et al.

(10) Patent No.: US 6,207,273 B1
(45) Date of Patent: Mar. 27, 2001

(54) PROCESS FOR PRODUCING FILAMENT AND FILAMENT ASSEMBLY COMPOSED OF THERMOTROPIC LIQUID CRYSTAL POLYMER

(75) Inventors: Kazuhiko Kurihara, Tokyo; Hiroshi Yazawa, Kinitachi; Toshikazu Oishi, Kawaguchi; Yoichi Mazawa, Yono, all of (JP)

(73) Assignee: Polymer Processing Research Institute Limited, Tokyo (JP)

(*) Notice: Subject to any disclaimer, the term of this patent is extended or adjusted under 35 U.S.C. 154(b) by 0 days.

(21) Appl. No.: 09/326,881

(22) Filed: Jun. 7, 1999

Related U.S. Application Data

(62) Division of application No. 08/433,313, filed on May 3, 1995, now Pat. No. 6,051,175.

(30) Foreign Application Priority Data

Sep. 3, 1993 (JP) .................................... 5-242193
Sep. 3, 1993 (JP) .................................... 5-242194

(51) Int. Cl.$^7$ ............................................. D01F 6/00
(52) U.S. Cl. ..................... 428/364; 428/362; 428/369; 428/399
(58) Field of Search ...................... 428/364, 362, 428/373, 372, 369, 399

(56) References Cited

U.S. PATENT DOCUMENTS 5,753,736 * 5/1998 Bhat et al. ......................... 524/787
5,976,998 * 11/1998 Sandor et al. ..................... 442/385

\* cited by examiner

Primary Examiner—Newton Edwards
(74) Attorney, Agent, or Firm—Bucknam and Archer

(57) ABSTRACT

A process for producing a filament assembly composed of a thermotropic liquid crystal polymer, which comprises melt extruding a thermotropic liquid crystal polymer through an orifice nozzle into a high-speed fluid to thereby hold filaments spun right under the spinning nozzle at a high temperature, so that the filaments are taken up at a high draft ratio by the frictional force of the high-speed fluid.

7 Claims, 12 Drawing Sheets

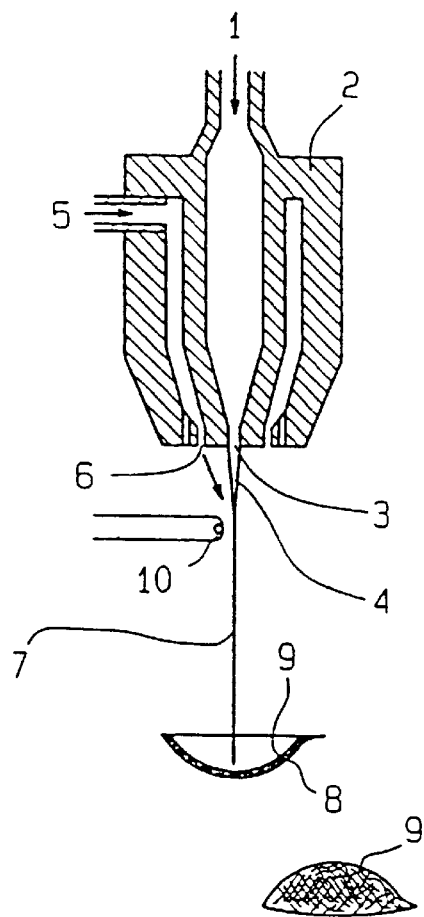
FIG. 1
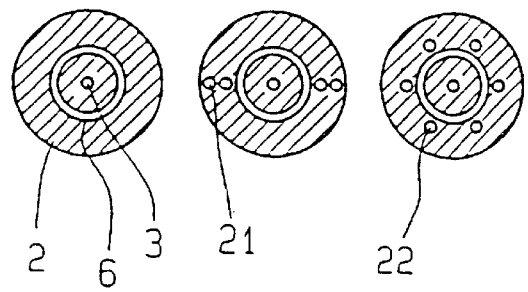
FIG. 2A    FIG. 2C
    FIG. 2B

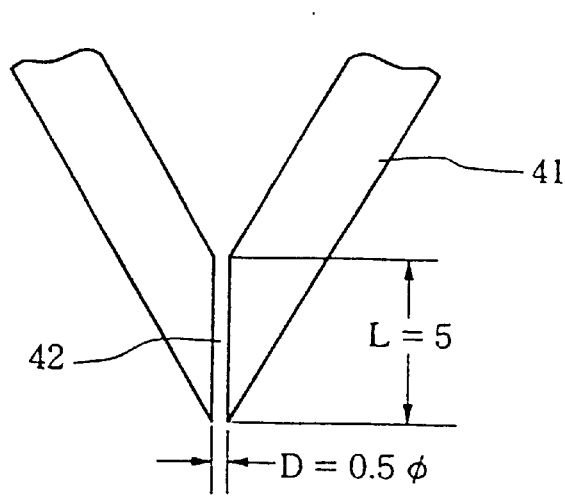
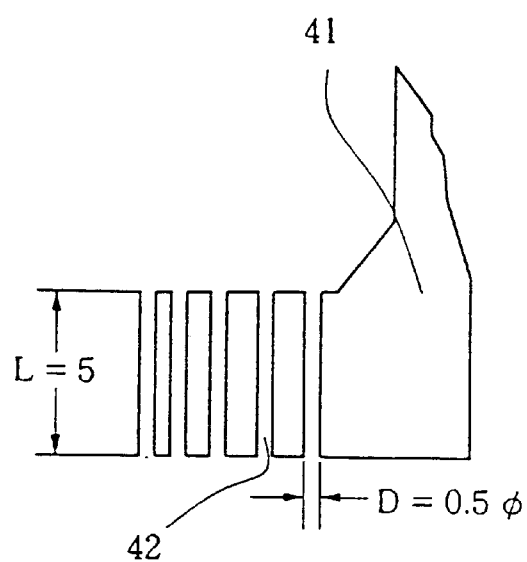
FIG. 7A        FIG. 7B
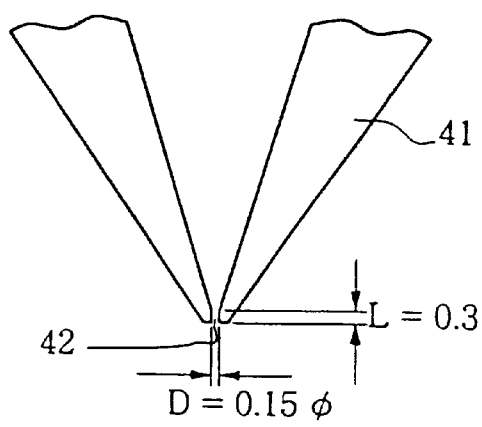
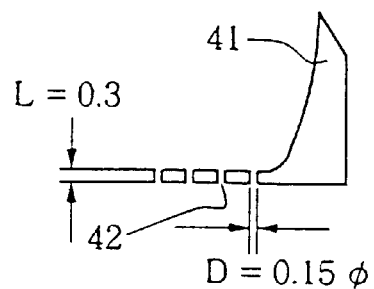
FIG. 8A        FIG. 8B

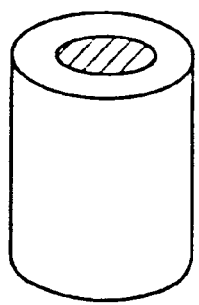 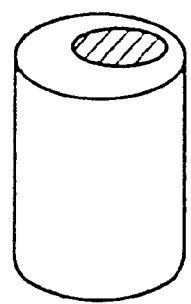
FIG. 16A  FIG. 16B
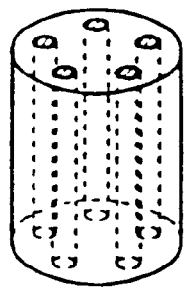 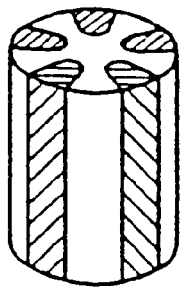 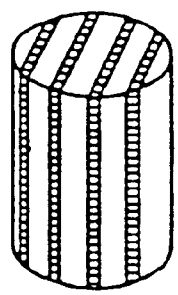 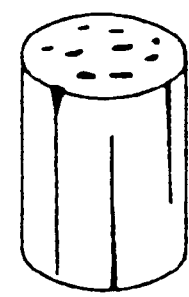
FIG. 17A  FIG. 17C
FIG. 17B  FIG. 17D

PROCESS FOR PRODUCING FILAMENT AND FILAMENT ASSEMBLY COMPOSED OF THERMOTROPIC LIQUID CRYSTAL POLYMER

This application is a division of Ser. No. 08/433,313, May 3, 1995, U.S. Pat. No. 6,051,175.

TECHNICAL FIELD

The present invention relates to processes for producing a heat-resistant filament and filament assembly of high strength and high elastic modulus each composed of a thermotropic liquid crystal polymer. Further, the invention relates to processes for producing a filament and a filament assembly in which a thermotropic liquid crystal polymer is mixed with another extrudable polymer and to the above filament assembly.

BACKGROUND ART

Since the emergence of a thermotropic liquid crystal polymer, the heat resistance thereof and the attainability of high strength and high elastic modulus thereby have been noted and thus some prior arts have been developed with respect to the process for producing the fiber (see, for example, U.S. Pat. Nos. 3,975,487, 4,468,364 and 4,161,470 and Japanese Patent Laid-Open Gazette No. 196716/1988).

It is known that the thermotropic liquid crystal polymer can have high strength and high elastic modulus only by spinning if it Is performed under appropriate conditions. Further, it is known that the heat treatment and redrawing can improve the strength and elastic modulus thereof. In particular, it is reported that some types exhibit a strength improvement to 5 to 6 times the original.

In the spinning of the above conventional thermotropic liquid crystal polymer filament, it has been necessary to conduct the spinning with the use of a nozzle having a very minute aperture for obtaining a fine denier filament because it is difficult to increase the draft ratio thereof. Further, extrusion abnormalities such as melt fracture are likely to occur. Thus, the extrusion rate cannot be made high resulting in extremely poor productivity.

Therefore, with respect to the properties of the obtained filament, no processes have been established for stably producing a filament with the ultimately high strength and elastic modulus at high productivity except on a laboratory scale.

The inventors have conducted extensive investigations into the causes of the low productivity of the prior art, the difficulty in stably producing a product with high strength and high elastic modulus and the poor spinning operation efficiency (end breakage, denier nonuniformity and product quality dispersion, etc.) in connection with the melt spinning of the thermotropic liquid crystal polymer filament. As a result, the following has been found.

(1) The thermotropic liquid crystal polymer as a starting material is not always uniform.

The cause is in an aspect an inevitable consequence of the technology of polymerizing the thermotropic liquid crystal polymer. In other aspects, the cause relates to the heat history difference and heat deterioration after polymerization and the increase of polymerization degree by heat treatment. With respect to these, a rapid product quality improvement has been attained for the recent years by virtue of, for example, polymerization and subsequent treatment technologies and post-polymerization filter technologies. However, the improvement is still not satisfactory.

(2) The melting point of the thermotropic liquid crystal polymer is so high that, after leaving the spinning nozzle, the surface of the filament is cooled by the temperature of the atmosphere with the result that the draft ratio cannot be made high.

Thus, a skin layer is formed at the surface of the filament, thereby creating a structural difference between the inner part and the surface part. This is an obstacle of the high quality (for example, high strength, elastic modulus and elongation). In the spinning of the customary thermoplastic polymers, the draft ratio can be increased in the form of a melt having left the nozzle to thereby orient the molecules. However, with respect to the thermotropic liquid crystal polymer, greater belief is in that the orientation is completed in the nozzle, and the thought has not arrived at a concept of stably increasing the draft ratio upon leaving the nozzle.

(3) The nozzle diameter is reduced for increasing the orientation in the nozzle. Further, the reduction of the nozzle diameter is inevitable for obtaining a fine denier because the above draft ratio cannot be increased.

However, the extrusion rate is proportional to fourth power of the nozzle diameter, so that the reduction of the nozzle diameter leads to extremely poor productivity. Further, the shear rate of the extrusion is inversely proportional to third power of the nozzle diameter, so that the reduction of the nozzle diameter leads to extremely high shear rate, thereby causing extrusion abnormalities such as melt fracture. With the use of a polymer having instability factors in its starting material such as the thermotropic liquid crystal polymer, stable operation cannot be conducted at shear rates close to the extremity.

(4) The thermotropic liquid crystal polymer filament is a functional fiber with high strength, elastic modulus, chemical resistance and heat resistance and further excellent electrical properties. However, it is also an industrial fiber, so that how cheaply the thermotropic liquid crystal polymer can be produced is important.

However, because of the above factors (1) to (4) affecting in combination, it has been unfeasible to stably produce a fine denier filament of thermotropic liquid crystal polymer with high strength and high elastic modulus on an industrial scale.

Often, the thermotropic liquid crystal polymer filament is used as an industrial reinforcing fiber in FRP, FRTP, concrete reinforcement and the like. In such uses, the thermotropic liquid crystal polymer must exhibit improved affinity for, adhesion to and uniform miscibility with the matrix.

The above thermotropic liquid crystal polymer has only been formed into fibers but not into a nonwoven web or a filament assembly because special spinning means and subsequent heat treatment are required therefor. In a simple assembly of rigid thermotropic liquid crystal polymer filaments, the filaments cannot be mutually entangled, so that the assembly is readily disintegrated with external force, thereby disenabling the holding of the outline as a filament assembly. Although the fixing with an adhesive can be thought of, the use of the adhesive is unfavorable because it generally degrades the heat resistance and electrical properties of the filament assembly. Further, heat-resistant adhesives are expensive.

A technique comprising shortly cutting the conventionally produced thermotropic liquid crystal polymer filament to thereby form the same into a nonwoven web or a paper has been reported (EPC Patent Laid-Open Gazette No. 167682 (A)). However, not only is the reinforcing effect of short fibers poor in the use in FRP and FRTP but also additional steps such as adhesive bonding and fibrillation for formation into a nonwoven web or a paper are inevitable. The fibrillation has a drawback of degrading the performance of the highly elastic fiber.

The heretofore proposed processes for producing a filament assembly or a nonwoven web from the thermotropic liquid crystal polymer filaments have drawbacks in that not only is a cost increase inevitable but also the production of a nonwoven web or filament assembly of long-fiber filaments is difficult and the quality of the resultant product is poor. Specifically, there are problems such that a binder is requisite for uniformity and filament integration and that the filaments are not loosened.

A filament of high strength and high elastic modulus cannot be obtained by melt spinning the thermotropic liquid crystal polymer through the melt spinning nozzle conventionally employed in the filament spinning followed by free fill and flow. Instead, the filament diameter is unfavorably large and an impracticable filament assembly (nonwoven web) results.

The reason has been revealed to be that the filament having exited the nozzle is oriented by the nozzle shear rate to thereby have increased strength and further the surface of the filament is cooled to solidify because of high melting point, so that only the weight thereof does not lead to application of a draft with the result that the filament diameter cannot be decreased.

An extreme increase In the shear rate in the nozzle for increasing the molecular orientation results in extrusion abnormalities such as melt fracture in the nozzle, end breakage upon exiting the nozzle and block formation (bundling) at the corresponding part in a filament assembly. Thus, a filament assembly of high quality cannot be obtained. Especially, in the filament assembly from the thermotropic liquid crystal polymer, uniform polymer cannot be obtained in the polymerization of the thermotropic liquid crystal polymer as a starting material and, further, thermal polymerization or decomposition is advanced by the influence of heat in the extruder and other means, so that the polymer dispersion is extensive in that some parts of the polymer have extremely high molecular weights or rather in the form of gels while some other parts are decomposed to exhibit low molecular characteristics. Thus, extrusion abnormalities are likely to occur.

Therefore, the current situation has been that a filament of high strength and high elastic modulus cannot be realized in industrially stable conditions.

Moreover, the filaments must be well entangled for forming a filament assembly. A simple assembly of thermotropic liquid crystal polymer filaments which are composed of rigid molecular chains and also thick is readily disintegrated and cannot function as an assembly.

On the other hand, in the use of an assembly of long-fiber filaments of high strength and high elastic modulus in FRP or FRTP, the attainment of uniform mixing of the filaments with a matrix polymer from not only the microscopic but also macroscopic viewpoints encounters an extreme difficulty in practice. Parts where the amount of the reinforcing material is small naturally have less reinforcing effect to thereby cause product defects, while, at parts where the amount of the reinforcing material is too large, not only is this wasteful but also the amount of the matrix resin is unsatisfactory to thereby also occasionally cause defects.

Therefore, in the use of continuous long-fiber filaments as reinforcing fibers in, for example, FRP or FRTP, how uniformly the filaments are mixed with the matrix resin is an important task.

In the above use, it is also important to provide the thermotropic liquid crystal polymer filaments as reinforcing fibers with the affinity for and the adherence to the matrix resin.

In the conventional FRP and FRTP, the arrangement of filaments is random in the filament assembly. In particular, when a plane strength is to be realized by arranging the filaments in a plane form, the current situation is that the filaments are incorporated in the FRP and FRTP in the form of a prepreg or a woven fabric of the reinforcing filaments. In the form of a prepreg or a woven fabric, however, not only are these per se expensive but also the fibers must be used in an excess amount because of a dense structure and, further, multiple layers must be incorporated in the reinforcement of a thick object, so that occasionally a shaped article as a whole becomes too expensive to put to practical use. Moreover, the prepreg and woven fabric may not fit a delicate configuration of a shaped article.

Therefore, a filament assembly is desired which is cheap and soft but has the filaments arranged along an intended direction.

Naturally, how effectively the cost reduction can be achieved is an important task because the thermotropic liquid crystal polymer filaments are mostly used as industrial materials.

U.S. Pat. No. 4,362,777 discloses a nonwoven web of thermotropic liquid crystal polymer filaments. However, the filaments are not entangled because those right under the spinning nozzle are not in a high-temperature atmosphere.

U.S. Pat. Nos. 4,442,266, 4,522,884 and 4,442,057 disclose filaments obtained by spinning of a blend of a thermotropic liquid crystal polymer and, for example, polypropylene. However, the filaments are not entangled because those right under the spinning nozzle are not in a high-temperature atmosphere.

DISCLOSURE OF THE INVENTION

It is a first object of the present invention to provide process for producing a thermotropic liquid crystal polymer filament of high strength and high elastic modulus which can stably be produced and which is improved in the affinity for, adherence to and uniform miscibility with a matrix.

It is a second object of the present invention to provide an assembly composed of continuous long-fiber filaments by resolving the above drawbacks of the prior art, by reducing the cost of the filament assembly (nonwoven web) while ensuring the heat resistance, high strength and high elastic modulus of the thermotropic liquid crystal polymer filament and by improving the affinity for, adherence to and uniform miscibility with a matrix and to provide a process for producing the same.

The above objects of the present invention can be attained by the following processes for producing a filament and a filament assembly and the following filament assembly.

That is, the first process of the present invention is defined as a process for producing a filament composed of a thermotropic liquid crystal polymer, which comprises melt spinning a thermotropic liquid crystal polymer through a spinning nozzle at a draft ratio of at least 30 while holding the filament spun right under the spinning nozzle at a high temperature (hereinafter referred to as "the process A").

The second process of the present invention is defined as a process for producing a filament assembly composed of filaments of a thermotropic liquid crystal polymer, which comprises melt extruding a thermotropic liquid crystal polymer into a high-temperature and high-speed fluid through an orifice nozzle to thereby hold filaments spun right under the spinning nozzle at a high temperature, so that the filaments are taken up at a high draft ratio by the frictional force of the high-speed fluid (hereinafter referred to as "the process B"). In this process, the draft ratio is increased to thereby not only reduce the filament diameter but also enhance the degree of molecular orientation so that filaments of high strength and high elastic modulus can be produced.

The third process of the present invention is defined as a process for producing a filament composed of a thermotropic liquid crystal polymer, which comprises melt spinning a mixture of a thermotropic liquid crystal polymer and a non-liquid-crystalline polymer through a spinning nozzle at a draft ratio of at least 50 while holding the filament spun right under the spinning nozzle at a high temperature (hereinafter referred to as "the process C").

The fourth process of the present invention is defined as a process for producing a filament assembly composed of filaments of a mixture of a liquid crystal polymer and another polymer, which comprises melt extruding a thermotropic liquid crystal polymer and a non-liquid-crystalline polymer into a high-speed fluid through an orifice nozzle, so that filaments are taken up at a high draft ratio by the frictional force of the high-speed fluid and entangled by the fluid (hereinafter referred to as "the process D"). In this process, a high shear rate is realized in the nozzle, so that an assembly of filaments each having high strength and high elastic modulus can be obtained. This process ensures uniform mixing and integration of the thermotropic liquid crystal polymer filaments and a matrix polymer in the use of the mixed assembly as a reinforcing fiber in FRP or the like.

Moreover, the filament assembly of the present invention comprises a plurality of mutually entangled long-fiber filaments of a thermotropic liquid crystal polymer.

The present invention will be described in greater detail below.

The terminology "thermotropic liquid crystal polymer" used herein means a thermoplastic polymer which can be melted when being heated and exhibits optical anisotropy when being melted. The above polymer which exhibits optical anisotropy when being melted has such a property that the molecular chains of the polymer take a regular parallel arrangement in the molten state. The characteristics of the optically anisotropic melt phase can be confirmed according to the customary polarization test method in which crossed polarizers are utilized.

Examples of the above liquid crystal polymers include liquid crystalline polyesters, polycarbonates and polyesterimides. Specifically, (wholly) aromatic polyesters, polyester-amides, polyamide-imides, polyester-carbonates and polyazomethines are mentioned.

The thermotropic liquid crystal polymer generally has a slender flat molecular structure in which the rigidity is high along the principal molecular chain and in which there are a plurality of mutually coaxial or parallel chain extending bonds.

The thermotropic liquid crystal polymer for use in the present invention comprehend a polyester composed of a polymer chain of which a part is composed of a segment that can form an anisotropic melt phase while the remaining part is composed of a segment that cannot form an isotropic melt phase. They also comprehend a compound polymer prepared by compounding plural thermotropic liquid crystal polyesters.

Representative examples of the monomers for use in the formation of the thermotropic liquid crystal polymer are:

(a) at least one member selected from aromatic dicarboxylic acids, (b) at least one member selected from aromatic hydroxycarboxylic acid compounds, (c) at least one member selected from aromatic diol compounds, (d) at least one member selected from aromatic dithiol ($d_1$), aromatic thiophenol ($d_2$) and aromatic thiol carboxylic acid ($d_3$) compounds, and (e) at least one member selected from aromatic hydroxyamine and aromatic diamine compounds.

In the polymerization, the monomers of the groups (a) through (e) above may be individually employed. However, in many cases, these are employed in combination, e.g., combinations of groups (a) and (c), groups (a) and (d), groups (a), (b) and (c), groups (a), (b) and (e), or groups (a), (b), (c) and (e).

Examples of the aromatic dicarboxylic acid compounds of the group (a) above are aromatic dicarboxylic acids such as terephthalic acid, 4,4'-diphenyldicarboxylic acid, 4,4'-triphenyl-dicarboxylic acid, 2,6-naphthalendicarboxylic acid, 1,4-naphthalendicarboxylic acid, 2,7-naphthalenedicarboxylic acid, diphenyl ether 4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenyl ether 3,3'-dicarboxylic acid, diphenoxyethane-3,3'-dicarboxylic acid, diphenylethane-3,3'-dicarboxylic acid and 1,6-naphthalenedicarboxylic acid; and products of substitution of the above aromatic dicarboxylic acids with an alkyl, an alkoxy or a halogen, such as chloroterephthalic acid, dichloroterephthalic acid, bromoterephthalic acid, methylterephthalic acid, dimethylterephthalic acid, ethylterephthalic acid, methoxyterephthalic acid and ethoxyterephthalic acid.

Examples of the aromatic hydroxycarboxylic acid compounds of the group (b) above are aromatic hydroxycarboxylic acids, such as 4-hydroxybenzoic acid, 3-hydroxybenzoic acid, 6-hydroxy-2-naphthoic acid and 6-hydroxy-1-naphthoic acid, and products of substitution of the above aromatic hydroxycarboxylic acids with an alkyl, an alkoxy or a halogen, such as 3-methyl-4-hydroxy-benzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methoxy-2-naphthoic acid, 2-chloro-4-hydroxybenzoic acid, 3-chloro-4-hydroxybenzoic acid, 2,3-dichloro-4-hydroxybenzoic acid, 3,5-dichloro-4-hydroxybenzoic acid, 2,5-dichloco-4-hydroxybenzoic acid, 3-bromo-4-hydroxybenzoic acid, 6-hydroxy-5-chloro-2-naphthoic acid, 6-hydroxy-7-chloro-2-naphthoic acid and 6-hydroxy-5,7-dichloco-2-naphthoic acid.

Examples of the aromatic diol compounds of the group (c) above are aromatic diols, such as 4,4'-dihydroxydiphenyl, 3,3'-dihydroxydiphenyl, 4,4'-dihydroxytriphenyl, hydroquinone, resorcinol, 2,6-naphthalenediol, 4,4'-dihydroxydiphenyl ether, bis(4-hydroxyphenoxy)ethane, 3,3'-dihydroxydiphenyl ether, 1,6-naphthalenediol, 2,2-bis(4-hydroxyphenyl)-propane and bis(4-hydroxyphenyl) methane, and products of substitution of the above aromatic diols with an alkyl, an alkoxy or a halogen, such as chlorohydroquinone, methylhydroquinone, t-butylhydroquinone, phenylhydroquinone, methoxyhydroquinone, phenoxyhydroquirone, 4-chlororesorcinol and 4-methyl-resorcinol.

Examples of the aromatic dithiol compounds of the group ($d_1$) above are benzene-1,4-dithiol, benzene-1,3-dithiol, 2,6-naphthalene-dithiol and 2,7-naphthalene-dithiol.

Examples of the aromatic thiophenol compounds of the group ($d_2$) above are 4-mercaptophenol, 3-mercaptophenol and 6-mercaptophenol.

Examples of the aromatic thiol carboxylic acid compounds of the group ($d_3$) above are 4-mercapto-benzoic acid, 3-mercapto-benzoic acid, 6-mercapto-2-naphthoic acid and 7-mercapto-2-naphthoic acid.

Examples of the aromatic hydroxyamine and aromatic diamine compounds of the group (e) above are 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether., 4-amino-4'-hydroxydiphenylmethane, 4-amino-4'-hydroxydiphenyl sulfide, 4,4'-diaminophenyl sulfide (thiodianiline), 4,4'- diaminodiphenyl sulfone, 2,5-diaminotoluene, 4,4'-ethylenedianiline, 4,4'-diaminodiphenoxyethane, 4,4'-diaminodiphenylmethane (methylenedianiline) and 4,4'-diaminodiphenyl ether (oxydianiline).

The thermotropic liquid crystal polymer for use in the present invention can be produced from the above monomers by the use of various esterification techniques including the melt acidolysis and slurry polymerization processes.

The molecular weights of thermotropic liquid crystal polyesters suitable for use in the present invention are each in the range of about 2000 to 200,000, preferably about 4000 to 100,000. The molecular weights of the above-mentioned compounds may be determined by various methods including one in which a compressed film is prepared and the terminal groups of the film are determined by infrared spectroscopy, and another in which GPC being the common measuring method is performed after the preparation of a solution of the compound.

Aromatic homo- or copolyesters each containing the monomer unit represented by the following general formula (1) as an essential component are preferred among the thermotropic liquid crystal polymers obtainable from the above monomers. It is preferred that this monomer unit be contained in each of the polymers in an amount of at least about 30% by mole. An amount of at least about 50% by mol is more preferably.

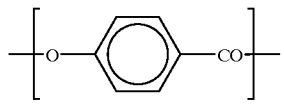

(1)

The aromatic polyester especially preferred for use in the present invention is one having the repeating units with structures respectively derived from three different compounds, i.e., p-hydroxybenzoic acid, phthalic acid and biphenol and represented by the following formula (2). In this polyester represented by the following formula (2), the repeating units each having a structure derived from biphenol may partially or wholly be replaced by the repeating units derived from dihydroxybenzene. Further, the aromatic polyester also especially preferred for use in the present invention is one having the repeating units with structures respectively derived from two different compounds, i.e., p-hydroxybenzoic acid and hydroxynaphthalene-carboxylic acid and represented by the following formula (3).

The thermotropic liquid crystal polymers for use in the present invention may be employed either individually or in combination.

A reinforcement or filler may be added to the thermotropic liquid crystal polymer in order to improve the heat resistance and mechanical properties thereof. Each of the reinforcement and the filler may be fibrous or particulate or a mixture of fibrous and particulate materials. Examples of the fibrous reinforcements include inorganic fibers such as glass, shirasu glass, alumina, silicon carbide, ceramic, asbestos, gypsum and metal (e.g., stainless steel) fibers and carbon fiber. Examples of the particulate reinforcements include metal oxides such as wollastonite, sericite, kaolin, mica, clay, bentonite, asbestos, talc, alminosilicate and other silicates, alumina, silicon oxide, magnesium oxide, zirconium oxide and titanium oxide, carbonates such as calcium carbonate, magnesium carbonate and dolomite, calcium sulfate, calcium pyrophosphate, barium sulfate and other sulfates, glass beads, boron nitride, silicon carbide and sialon. These may be hollow (e.g., hollow glass fiber, glass microballoon, shirasu balloon and carbon balloon). If desired, pretreatment may be conducted with a silane or titanium coupling agent prior to the application of the above reinforcements.

Conventionally employed additives such as an antioxidant and a heat stabilizer (e.g., hindered phenols, hydroquinone, phosphates and their substitution products), an ultraviolet absorber (e.g., resorcinol, salicylates, benzotriazole and benzophenone), a lubricant and a mold releasing agent, a dye (e.g., nitrocin.), colorants including a pigment (e.g., cadmium sulfide, phthalocyanine and carbon black), a flame retarder, a plasticizer and an antistatic agent may be added in an amount in which these are not detrimental to the objects of the present invention for imparting desired properties to the thermotropic liquid crystal polymer. The reinforcement, filler and other additives can be added in an amount of 80% by weight or less and preferably 70% by weight or less based on the total weight of the composition.

The above filaments may contain a surface treatment and an adhesive for combination with other materials such as FRP and FRTP and a matrix.

In the processes A and B according to the present invention, the melt of the thermotropic liquid crystal polymer filament upon exiting the melt spinning nozzle is directly heated and/or the temperature of the atmosphere right under the nozzle is held high to thereby increase the draft ratio at that place so that the molecular orientation is increased.

In the conventional process for melt spinning the thermotropic liquid crystal polymer, the orientation of the liquid

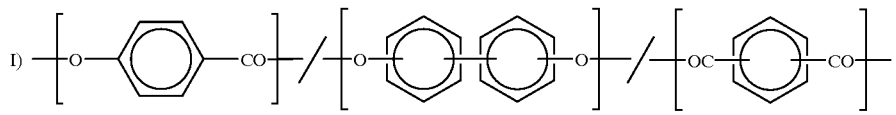

(2)

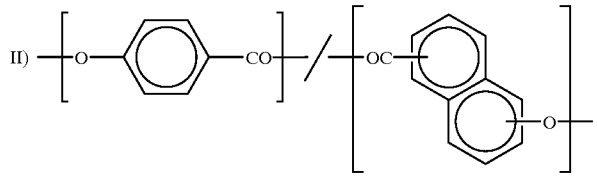

(3)

crystal polymer entirely relied on the shear force in the nozzle. Under the assumption that the dispersion of the uniformity of the liquid crystal polymer is unavoidable to a certain extent as mentioned above, however, increasing the shear force to the extremity leads to extrusion abnormalities such as melt fracture at heterogeneous high-polymerization-degree parts and to filament breakage upon exiting the nozzle. This shear increasing method is not feasible on an industrial scale.

Thus, in the present invention, the thermotropic liquid crystal polymer is passed through the nozzle at a shear rate such that end breakage does not occur and thereafter the temperature of the molten polymer is held high so as to increase the draft ratio, thereby obtaining a filament assembly. In this process, although heterogeneous high-polymerization-degree parts undergoes such a high molecular orientation in the nozzle that the same drafting leads to a low draft ratio, the above parts are generally narrow and substantially no defects are observed in the filament assembly as a whole despite some irregularity in the filament denier. The filament drafted at such a high ratio naturally has strength and elastic modulus higher than those of less drafted filaments.

The advantages of the processes A and B according to the present invention reside in that fine denier can be realized by increasing the draft ratio when comparison is made with the same nozzle. That is, conventionally, attempts have been made to use a nozzle as narrow as possible (as narrow as 0.1 mm or less) for realizing fine denier because of the incapability of increasing the draft ratio. However, this extremely lowers the productivity because the extrusion rate is proportional to fourth power of the nozzle diameter, and the small nozzle diameter is likely to cause melt fracture and nozzle clogging. The small diameter is more disadvantageous than advantageous.

In the processes of the present invention in which the draft ratio is increased, not only can the above drawbacks be avoided but also the increase of the draft ratio leads to the increase of the take-up speed, thereby increasing the production speed.

The processes of the present invention are characterized by increasing the draft ratio while holding the temperature of the atmosphere right under the spinning nozzle high.

The temperature of the atmosphere has been extensively studied. As a result, it has been found that it is preferred that the temperature at a point 50 mm under the nozzle be the melting point of the employed thermotropic liquid crystal polymer minus 150° C., especially minus 50° C., or higher. The melting point is measured by DSC.

At any rate, the temperature of the atmosphere is substantially lower than the melting point of the polymer. The increase of the draft ratio effected despite the temperature being lower than the melting point would be attributable to that the filament per se has heat capacity even if the temperature is lowered to some extent, the thermotropic liquid crystal polymer can be deformed at temperatures lower than the melting point, that the crystallization rate of the thermotropic liquid crystal polymer is low, that the filament has a high melt strength because of the molecular orientation made in the filament to thereby have resistance to nozzle breakage, etc. However, when the temperature decrease is extreme, the draft ratio cannot be increased probably because of the formation of a skin layer.

With respect to the temperature of the atmosphere, the terminology "right under the nozzle" means a location in close vicinity to the nozzle along the filament spinning direction. The above terminology is used because the filament is extruded from up to down. Thus, when the spinning is conducted from down to up, the location is right over the nozzle. When the spinning is conducted horizontally, the location is right beside the nozzle. In the present invention, these locations are collectively referred to by the terminology "right under the nozzle".

Either direct or indirect heating may be adopted for increasing the temperature of the atmosphere. For example, hot air blow from the die, heat-medium heating and heat insulating mold are all effective. The polymer melt filament may be heated by infrared radiation (including laser radiation).

Particular heating means will be described in the Examples described hereinafter.

An apparent draft ratio is calculated by dividing the spinning take-up velocity by the flow velocity of the polymer flowing out of the nozzle. The apparent draft ratio may be defined as the square of the value of (nozzle diameter/filament diameter), which is, however, not appropriate because it ignores the density difference between the melt and the solid.

In the present invention, the above appropriate apparent draft ratio is expressed as the draft ratio.

The draft ratio cannot be increased in the conventional spinning of the thermotropic liquid crystal polymer filament. There are even techniques characterized by decreasing the draft ratio (for example, U.S. Pat. No. 4,468,364).

Generally, the draft ratio of the spun thermotropic liquid crystal polymer filament is in the range of 1 to 20 (e.g., Examples of Japanese Patent Laid-Open Gazette No. 114723/1977). In the present invention, a draft ratio of at least 30 is readily attained, a draft ratio of at least 50 is preferred, and a draft ratio of at least 100 is also attainable by virtue of the particular means provided for increasing the draft ratio.

From the viewpoint of the phenomenon observed in the vicinity of the nozzle in connection with the increase of the draft ratio, the thinning by drafting (thinning zone) ends within 100 mm under the nozzle in the spinning of the conventional thermotropic liquid crystal polymer filament. In contrast, the thinning reaches about 200 mm, 300 mm under optimum conditions, under the nozzle in the processes A and B of the present invention.

This is the factor permitting the increase of the draft ratio. The freedom from rapid thinning is also the factor preventing filament end breakage.

A draft tension may be imparted to the filament by the frictional force of the fluid caused to flow along the filament.

The above-mentioned hot air blown from the die for increasing the temperature of the atmosphere right under the nozzle also serves to impart the draft tension to the filament. That is, the hot air serves a double purpose. Moreover, the hot air serves to entangle the filaments. The die resembling the conventional die for melt blow fabrication of a nonwoven web of polypropylene or polyesters may be used in this process.

In the melt blow fabrication of a nonwoven web of a non-liquid-crystalline polymer, e.g., a polyolefin such as polyethylene or polypropylene or a polyester, however, the hot air is used to thin the filament and does not contribute to the improvement of the strength and elastic modulus. In contrast, the thermotropic liquid crystal polymer filament of the present invention is not thinned to such an extremely small filament diameter as in the melt blow of the non-liquid-crystalline polymer. The present invention is different from the conventional melt blow in that a filament of high strength and high elastic modulus is obtained only by the spinning. Further, the present invention is different in that the amount of hot air is only a fraction of that employed in the melt blow of the nonwoven web. The processes for producing a filament and an assembly according to the present invention are entirely different in the object and effect from the above prior art because of the difference in the constitutional features attributed to the use of the thermotropic liquid crystal polymer.

The melt blow die may be used as the spinning nozzle in the present invention. The conventional melt blow die has a ratio of nozzle length (L) to nozzle diameter (D), L/D, of about 10, and the diameter of the nozzle is about 0.5 mm. It has been found that the use of such a die as it is in the spinning of a nonwoven web of thermotropic liquid crystal polymer filaments is very unfavorable. As a result of further extensive investigations, it has been found that it is preferred that the diameter of the spinning nozzle be 0.3 mm or less, preferably 0.2 mm or less and still preferably 0.15 mm or less. Also, it has been found that the ratio of nozzle length (L) to nozzle diameter (D), L/D, be preferably 5 or less and still preferably 3 or less.

The so-called suction box using method may be mentioned as another method in which the fluid is utilized for imparting a draft tension to the filament. This method has been employed in the production of a spun bonded nonwoven web. The use thereof in combination with the process of the present invention in which the temperature of the polymer is held high right under the nozzle further improves the strength and elastic modulus of the thermotropic liquid crystal polymer filament.

In the production of the conventional spun bonded nonwoven web of a non-liquid-crystalline polymer, e.g., a polyolefin such as polyethylene or polypropylene or a polyester, the temperature is rather held low right under the nozzle to thereby increase the orientation of the filament for strength improvement.

In contrast, in the spinning of the thermotropic liquid crystal polymer filament according to the present invention, the melting point of the liquid crystal polymer is so high that, when the temperature right under the nozzle is low, a skin layer is formed at the surface of the filament, thereby disenabling the draft ratio increase. Thus, in the present invention, the temperature of the polymer right under the nozzle is held high contrary to the conventional spun bonding to thereby produce a filament assembly of high strength and high elastic modulus. Illustratively, by virtue of holding the temperature right under the nozzle, the thermotropic liquid crystal polymer filament of the present invention can have a strength as high as at least 5 g/d after the spinning and at least 20 g/d after the heat treatment, which strength cannot be realized in the conventional process for producing a spun bonded nonwoven web. Thus, the effect of the present invention is markedly distinct. In the conventional spun bonding process, the strength is about 2 g/d at the best.

The fluid is effective not only in drafting the above melt filament but also in mutually entangling the filaments. Therefore, it is preferred that the filaments be caused to arrive at a conveyor or an assembly mold prior to the drop of the flow velocity of the fluid.

The fluid is generally a gas such as air. When an oxidizing atmosphere is to be avoided, nitrogen gas may be used. When a surface treatment of the filament is conducted, a gas having surface treating activity such as ozone may be mixed into the high-temperature atmosphere. The fluid naturally may be a liquid. In the use of a liquid, a greater tractive force can be imparted to the filament. Filament surface treatments (adhesive for use in FRP or FRTP, adhesive for strengthening the mutual filament bonding, etc.) may also be mixed into the liquid.

The above fluid may be recycled. The recycling includes not only the recycling of the fluid per se but also the recycling of the heat therefrom.

Besides the fluid, a draft tension can be imparted to the filament by the frictional force of nip rolls and a set of rotary rolls. The use of the frictional force is advantageous in that a mechanically quantified draft ratio can be provided, thereby contributing to product quality stabilization. However, this method is less effective in entangling the filaments, so that it is needed to employ the same in combination with the fluid using process.

In the use of the above method in combination with the fluid using process, it is important to first carry out the drafting of the filament with the fluid.

The conventional thermotropic liquid crystal polymer filaments generally have voids. In contrast, substantially no void formation is recognized in the filaments obtained by the processes of the present invention. This is, for example, apparent from the densities of the filaments. For example, it is recognized that the filament produced by the process of the present invention has a density about 1 to 2% higher than that of the filament produced by the conventional melt spinning process in which the spun filament is only cooled and wound without the application of any heated high-speed fluid. This is because there is substantially no void formation recognized. Naturally, micrographic observations of filament sections show the above fact.

In the process A of the present invention, the filament may be wound in the form of a bobbin, a cone, a cheese or a hank according to the conventional take-up technique.

The heat treatment of the obtained filament may be performed, for example, by heating the filament wound in the form of a hank in a hot air oven while applying a tension, so that a product of high strength and high elastic modulus can be obtained.

In the process B of the present invention, the filaments are assembled by piling the same in a given mold (e.g., helmet-shaped mold) to thereby produce a product of a prescribed shape. In this process, generally, the shape of the filament exiting the nozzle does not agree with that of the product mold, so that the mold is moved to thereby produce a filament assembly with the given shape. When the product mold has a very large shape, it may be rational to connect a flexible hose to a nozzle portion through which the filaments are blown and to move the nozzle.

Effective hear treatment of the thermotropic liquid crystal polymer filaments may be conducted by rendering the product mold ventilative and circulating hot air through the filaments piled in the mold.

Naturally, the product may be removed from the mold and heat treated. In this case, it is requisite that the filaments be entangled so well as to retain the shape of the product in cooperation.

The filaments may be assembled in a different manner in which the filaments are piled at a given width on a traveling belt conveyor to thereby obtain a roll of continuous nonwoven web as a product.

With respect to the heat treatment of the nonwoven web product, the nonwoven web product is ventilative, so that the heat treatment may be carried out by using a porous pipe as the roll core and by blowing hot air out from inside the pipe in a heat treatment chamber.

The filaments of high strength and high elastic modulus as obtained in the present invention are so rigid that it is difficult to mutually entangle them. Thus, the above filaments have not been available in the form of a filament assembly or nonwoven web which can be handled in an independent body because of satisfactory entanglement of the filaments.

The diameter of the filament is important for ensuring satisfactory entanglement. When the filament diameter is 50

μm or greater, the rigidity would render the entanglement unsatisfactory. It is desired that the filament diameter be 30 μm or less and more preferably 25 μm or less.

In the present invention, the obtained filament assembly or nonwoven web can be handled as an integrated body because of satisfactory mutual entanglement of the filaments. Further, when the resultant product is used as an independent body or a composite, the product strength can be improved.

The filament diameter and length appearing herein have been measured in enlarged micrographs.

As another feature of the appearance of the filament according to the present invention, it is important that the filament be flexed or curled.

The filaments are neither flexed nor curled in the simple piling of the filaments obtained by the conventional melt spinning process.

The flex or curl (herein referred to as "curl ratio") is defined as follows.

An enlarged photograph is taken of a filament assembly as an object, and the radii of curvature of the filaments constituting the filament assembly are measured. The measurements are averaged and divided by the photograph magnification to thereby express the curl ratio.

The curl ratio of the filament assembly of the present invention ranges from several millimeters to several tens of millimeters. There is no sample having a curl ratio of greater than 50 mm. In contrast, with respect to filament assemblies composed of commercially available thermoplastic liquid crystal polymers, most of them each have a curl ratio of greater than 100 mm, and none has a curl ratio of less than 50 mm.

The filament of the thermotropic liquid crystal polymer constituting the present invention must be one which can be treated to have high strength and high elastic modulus.

The filament of the thermotropic liquid crystal polymer is characterized by having high strength and high elastic modulus, which are obtained by heat treatment.

The tensile strength of the filaments composing the filament assembly of the present invention is at least 2.5 g/d, preferably at least 3 g/d and still preferably at least 5 g/d. The highest value of the tensile strength is generally 100 g/d or less. A heat treatment improves the tensile strength of the filaments to at least 8 g/d, preferably at least 15 g/d and still preferably at least 20 g/d.

The tensile strength of the filaments according to the present invention is measured by the following method.

Filaments are extracted from a filament assembly, and the diameters thereof are measured by the use of a microscope. The measurements are converted to deniers.

The tensile strength (gram) of each of the filaments whose diameters have been measured is measured in accordance with JIS L-1069 and divided by the above filament denier to thereby obtain the tensile strength of the filament. The average is calculated with respect to 20 filaments to thereby obtain the average tensile strength. The interchuck length is set at 20 mm, and the pulling rate is set at 20 mm/min.

The tension modulus is also important. The thermotropic liquid crystal polymer filament of the present invention has a high tension modulus. The tension modulus increases to 2 to 3 times that before heat treatment by heat treatment at least 85 g/d, preferably at least 150 g/d and still preferably at least 350 g/d.

The strength of the thermotropic liquid crystal polymer component of the filament composed of a thermotropic liquid crystal polymer and a non-liquid-crystalline polymer can be calculated from the strength of the filament obtained by spinning only the non-liquid-crystalline polymer under the same conditions and the ratio of the thermotropic liquid crystal polymer component.

Filament extraction is difficult because of the low strength and elastic modulus from the conventional spun bonded and melt blown nonwoven webs of polypropylene, polyesters and polyamides. In contrast, extraction is relatively easy from the filament assembly of the present invention because of the high strength and high elastic modulus of the filaments.

In the processes C and D of the present invention, an extrudable non-liquid-crystalline polymer is mixed and spun for increasing the orientation of the thermotropic liquid crystal polymer in the nozzle, so that the shear rate in the nozzle is increased, thereby realizing a thermotropic liquid crystal polymer filament of high strength and high elastic modulus.

With respect to the thermotropic liquid crystal polymer, persons of ordinary skill in the art to which the invention pertains well know that the increase of the shear rate in the nozzle produces a strong filament. However, the increase of the shear rate causes extrusion abnormalities such as melt fracture as mentioned above and thus filament end breakage at the nozzle. Therefore, conventionally, the spinning is conducted at a shear rate of about $10^3$/sec (see, for example, Japanese Patent Laid-Open Gazette No. 196716/1988).

In the present invention, even a thermotropic liquid crystal polymer having a large molecular weight can be stably spun at a shear rate of 100,000/sec or higher by virtue of the mixing of the extrudable non-liquid-crystalline polymer.

The part of the thermotropic liquid crystal polymer in the filament spun at the high shear rate naturally has excellent molecular orientation and thus high strength and high elastic modulus.

Generally, it is known that the melt spinning of a mixture of low molecular weight and high molecular weight polymers at a high shear localizes the low molecular weight polymer in the vicinity of the inner wall of the nozzle, so that the surface of the spun filament is mainly composed of the low molecular weight polymer. In the processes of the present invention comprising mixing of the non-liquid-crystalline polymer, however, similar phenomena occur without regard to the magnitude of the molecular weight, the spinning can be conducted at a high shear rate, and a markedly high draft ratio can be attained.

It is feasible not only to have a filament formed if a mixture of the thermotropic liquid crystal polymer and the non-liquid-crystalline polymer but also to mix the thermotropic liquid crystal polymer filament with the non-liquid-crystalline polymer filament to thereby obtain a multifilament. In the latter, it is needed that the thermotropic liquid crystal polymer filament be strong.

As expressed by the following formula, the shear rite (γ) is inversely proportional to third power of the radius of nozzle (r) while the extrusion rate (Q) is proportional to the shear rate.

$$\gamma = 4Q/\pi r^3$$

The above formula shows that the decrease of the nozzle diameter for obtaining a fine denier filament increases the shear rate to thereby increase the possibility of end breakage.

With respect to the nonwoven web obtained by spinning a mixture with a polymer having no liquid crystal properties (EP), it has been found that, besides the realization of a high shear rate, a high draft ratio can be attained, and that a fine fiber of high strength can be realized without the need to resort to high shear rate. That is, in the filament spun through the nozzle, the EP migrates to the surface by virtue of the shear rate in the nozzle and the subsequent draft so as to prevent formation of a skin of TLCP on the surface with the result that a high draft ratio can be realized. The spinning of the above mixture ensures ready realization of a draft ratio of at least 50, especially at least 100. This high draft ratio leads to realization of a high strength.

Further, it is advantageous to provide means for holding the filament spun right under the spinning nozzle at a high temperature according to the present invention for realizing a high draft ratio. Still further, the draft ratio can effectively be increased by the employment of a composite fiber having a core-sheath structure in which EP forms the sheath while TLCP forms the core.

Therefore, the processes C and D of the present invention not only produce filaments of high strength and high elastic modulus but also increase the production volume by several times.

The mixing including kneading is represented by the term "mixing" for simplicity herein, and in the present invention at least two polymers must be satisfactorily mixed. When the degree of mixing is unsatisfactory, only the thermotropic liquid crystal polymer (TLCP) is extruded in some parts while only the extrudable polymer (EP) is extruded in some other parts, so that the object of the present invention cannot be attained.

Even at the stage of the mixing of starting material pellets, a uniform mixing must be accomplished. The extruder suitable for use in the present invention includes single and double-screw extruders and further a vent type extruder. The extruder is preferably provided with a gear pump for ensuring the quantification of the extrusion rate. Further, it is advantageous to effect highly mixing with a static mixer upon the exiting from the extruder or just before the nozzle.

There are other systems of mixing of the thermotropic liquid crystal polymer and the extrudable non-liquid-crystalline polymer in the filament, which include those such as a fiber having a sectional structure like islands being scattered in a sea (island-in the sea structure), a split fiber and a multilayer fiber employed in the production of a synthetic leather from the conventional fine fiber of polyethylene terephthalate.

With respect to the mixed extrudable non-liquid-crystalline polymer, various types may be used as long as the melt fracture is not caused at a high shear rate.

The non-liquid-crystalline polymer serves a double purpose if not only is it used for effecting the high shear rate but also it functions as a matrix resin or an adhesive polymer for bonding with a matrix resin in the use of the thermotropic liquid crystal polymer filament of the present invention as a reinforcing filament in FRTP or FRP. In the latter, the miscibility with the matrix resin is improved.

The extrudable non-liquid-crystalline polymer for use in FRTP is, for example, polyethylene terephthalate (PET) or polybutylene terephthalate (PBT), which exhibits excellent miscibility with the thermotropic liquid crystal polymer. A polyolefin resin, e.g., PP or PE modified with an acid such as maleic acid is suitable for use in the FRTP based on polypropylene (PP). Further, various thermoplastic polymers such as polycarbonates, polyamides and polyolefins may be used as the extrudable non-liquid-crystalline polymers.

Slow curing resins, epoxy resins having low curing agent contents, unsaturated polyester resins and phenolic resins may be used as the extrudable non-liquid-crystalline polymers for use as the matrix resins in the FRP.

The non-liquid-crystalline polymer used herein is a resin which is extrudable and which does not exhibit optical anisotropy when being melted. Examples of the resins include polyolefins such as polyethylene and polypropylene; acid-modified polyolefins obtained by modifying the polyolefin by copolymerization or graft polymerization with maleic anhydride, acrylic acid, methacrylic acid, unsaturated esters such as methyl esters thereof, vinyl acetate or other unsaturated acids; polyesters such as polyethylene terephthalate and polybutylene terephthalate; polystyrene; polyvinyl chloride; ABS resin; nylon and other polyamides; polycarbonates; polysulfides; polyphenylene ether; and polyether ether ketone (PEEK). Of these, polyolefins, acid-modified polyolefins and polyesters are preferred.

The thus mixed thermoplastic resin is extruded in the form of a filament, which is optionally cut into fixed lengths. The resultant filament is used as a reinforcing fiber in FRP or FRTP. It is desired that the thermoplastic resin be a matrix resin for the FRP or FRTP. It is also desirable that the resin be a polymer compatible with the matrix resin.

When the mixed thermoplastic polymer is to be finally removed, this can be easily accomplished while being heated at the stage of the heat treatment of the thermotropic liquid crystal polymer filament.

With respect to the mixing proportion, the extrudable non-liquid-crystalline polymer may be mixed in an amount of 10% by weight or less when the polymer is finally to be removed or when the polymer is allowed to remain in the final product but only for use as an adhesive with the matrix. On the other hand, when the polymer is used, without being removed, as a matrix resin in FRP or FRTP, the non-liquid-crystalline polymer may be mixed in an amount as large as 50 to 98% by weight. That is the mixing ratio of the thermotropic liquid crystal polymer to the extrudable non-liquid-crystalline polymer is 0.5:99.5 to 99.5:0.5 (on the weight basis).

In the present invention, combining the processes A and B with the processes C and D is advantageous. In particular, when the amount of the extrudable non-liquid-crystalline polymer is small in the process C and D, the combination with the processes A and B is especially advantageous.

The localization of much of the extrudable non-liquid-crystalline polymer component at the surface of the filament as mentioned above prevents the formation of a skin layer at the surface of the thermotropic liquid crystal polymer filament. This is also advantageous from the viewpoint of the increase of draft ratio.

In FRP or FRTP, the thermotropic liquid crystal polymer filament and the matrix polymer should be uniformly distributed. As a means for uniforming the distribution, the matrix resin for use in FRP or FRTP or a polymer having affinity for the matrix resin may be filamentous and mixed with the thermotropic liquid crystal polymer filament in the filament assembly to thereby effect uniform mixing with the matrix polymer.

In this process, the matrix polymer to be mixed should be an extrudable non-liquid-crystalline polymer, this polymer being extruded through another nozzle. Often, the combination with the processes A and B of the present invention is advantageous. The extrudable non-liquid-crystalline polymer to be discharged through the nozzle need not account for the whole of the matrix of the FRP or the like as the final product. In the fabrication of FRP or the like, another matrix may be added to thereby shape the FRP or the like.

In the filament assembly, the filaments may be arranged in the desired direction to thereby produce an assembly ensuring effective exertion of the capabilities of the filaments of high strength and high elastic modulus.

Although the thermotropic liquid crystal polymer filaments of the present invention are characterized by the high orientation of the molecules, the capabilities thereof may be highly exerted by arranging the filaments. A complete arrangement of the filaments as in the prepreg is not needed. It is satisfactory for 70 to 80% of the constituent filaments to arrange in a given direction. Although the direction of the arrangement is not particularly limited as long as the arrangement is made in a given direction, the arrangement in the longitudinal direction (along the line) or the transverse direction is preferred in a continuous web being in the form of a nonwoven web.

The arrangement of the filaments in the desired direction enables the filament assembly to effectively exert the capabilities of the filaments of high strength and high elastic modulus.

The conventional arranged nonwoven webs have been produced by orienting a nonwoven web composed of a thermoplastic polymer or by solution spinning of a cellulosic polymer (Japanese Patent Laid-Open Gazette No. 148861/1989 and U.S. Pat. No. 5,312,500).

In the present invention, orienting means is not particularly needed. An arranged nonwoven web can be produced by applying orthogonal or crossed hot air to vibrating molten filaments.

Further, in the present invention, the thermotropic liquid crystal polymer filament can be mass produced at a reduced cost by causing the flow velocity of the fluid to impart the take-up tension for melt spinning of the thermotropic liquid crystal polymer and by accommodating the spun filament in a container such as a box or a can.

The accommodation of the spun filament in a box or other containers is regarded as an effective means taking advantage of the properties peculiar to the thermotropic liquid crystal polymer filament because a highly oriented filament can be obtained only by spinning of the thermotropic liquid crystal polymer filament and because the subsequent heat treatment can be conducted for the filament while being accommodated in the box or other containers. Further, the above accommodation method is especially advantageous in the industrial mass production. In the production of pile or chopped strands by subsequently cutting the thermotropic liquid crystal polymer filament, this take-up and accommodation method is especially advantageous because rare occurrence of breakage is usually not significantly detrimental to the product quality.

Heat treatment of the filament by rendering the above container such as a can or a box ventilative, for example, by providing the wall of the box with porosity and then by circulating hot air within the container holding the filament therein is also an effective heat treatment method for the thermotropic liquid crystal polymer filament. When the filament is in the form of a bobbin, it is difficult to uniform the temperature down to the core. Even if the temperature is uniformed, the heating period is different according to portions, thereby causing the effect of the heat treatment to be different according to portions. In the bobbin, the strength and elastic modulus of the filament at the surface are different from those at the core.

Heat treatment improves the strength and elastic modulus of the filament spun by the processes of the present invention. Especially, the improvement of the strength is marked.

The heat treatment may be conducted in the form of not only the filament but also a woven web, chopped strands, a nonwoven web or a shaped article such as FRP or FRTP.

The heat treatment of the shaped filament assembly may be conducted either inside the mold or outside the mold. A roll of, for example, a nonwoven web may undergo heat treatment in the form of the roll as mentioned hereinbefore.

Alternatively, the nonwoven web may be unrolled in a heat treatment chamber and heat treated.

Further, the nonwoven web may be heat treated during the continuous flow thereof.

The shaped article such as FRP may be heat treated in the form of the shaped article.

Even the filament having been just spun according to the present invention and having not yet undergone heat treatment has a certain level of strength, and especially its elastic modulus is high, so that it can often be put in practical use without any heat treatment or only with some heat inevitably applied thereto in the subsequent steps.

In the formation of FRP or the like, the filament assembly of the present invention may be mixed with a matrix and heat pressed (when the filament assembly is produced according to the processes C and D and thus already contains a matrix, the above mixing is omitted and the filament assembly is heat pressed as it is).

The filament assembly of the present invention together with a matrix resin may be formed into a sheet for use as a stampable sheet.

The filament assembly of the present invention may not need a matrix as different from FRP and FRTP and may independently be used as a beat insulating material, a sound absorbing material, a filter or the like.

In the present invention, a filament assembly of high strength and high elastic modulus is directly obtained from the spinning stage, so that the cost of the filament assembly per se is low. Further, the filament assembly of the present invention may be treated with an adhesive for use as a reinforcing fiber for FRP or the like, the uniform dispersibility thereof may be high, it may reduce the fiber usage and the filament assembly may have a product shape. Therefore, the costs for obtaining the final product can be reduced.

The filament assembly of the present invention may be in the form of an independent article shaped like a helmet, a container for high voltage transformer, an automobile bumper, a filter, a heat insulating material, a cloth, a sheet, a plate or a pipe.

BRIEF DESCRIPTION OF THE DRAWINGS

FIG. 1 is a view of one form of apparatus adapted to effect heating right under a nozzle with hot air, which shows one mode of process for forming a helmet-shaped filament assembly;

FIG. 2 is a view of a lower side of the spinning apparatus 2 shown in FIG. 1;

FIG. 7 is a view of one form of nozzle part of the conventional melt blow die;

FIG. 8 is a view of one form of nozzle part of a melt blow die suitable for use in the present invention;

FIG. 16 is a view of an inner structure of a filament composed of a composite fiber having a sheath-core structure obtained according to one mode of process of the present invention;

FIG. 17 is a perspective view of filaments obtained by the use of various types of nozzles;

BEST MODE FOR CARRYING OUT THE INVENTION

Figure 3:
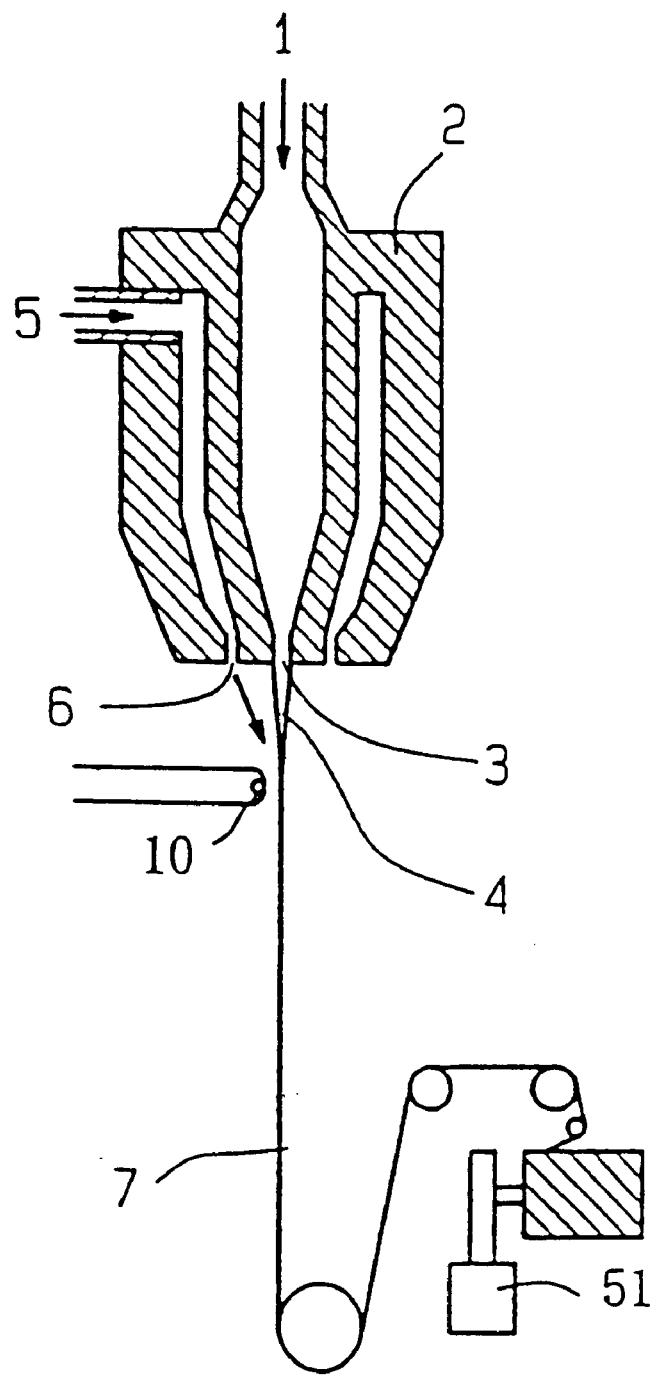
FIG. 3 is a view of one form of apparatus adapted to effect heating right under a nozzle with hot air, which shows one mode of the process A of the present invention.

Hereinbelow, embodiments of the present invention will be described in detail with reference to the drawings.

means of an extruder and a gear pump (both not shown). A molten filament 4 is extruded through a nozzle 3. Hot air of high pressure 5 is fed to the spinning apparatus 2 and blown through an aperture 6 provided in close vicinity to the nozzle along the filament 4. Even if hot air is blown, it catches up cold air therearound to thereby become 40 to 50° C. air several tens of millimeters under the nozzle. Thus, the melt is solidified to become a filament 7, which is piled on a helmet-shaped mold 8, so that a filament assembly 9 is obtained. The helmet-shaped mold 8 is moved so as for the filament to uniformly pile on the mold (when thicker parts are desired, so moved).

A thermocouple 10 with a thin tip (1 mm in diameter) is disposed at a position 50 mm under the nozzle (when the nozzle is directed downward) to thereby measure the temperature there.

The thermocouple 10 is to be as small as possible so as to sensitively detect the temperature. The measuring time is set at 3 min to prevent the temperature of the thermocouple from going up by the radiant heat from the spinning apparatus 2.

FIG. 1 shows the use of a single nozzle. A plurality of nozzles may be used in combination.

FIG. 2 is a view of a lower side of the spinning apparatus 2 of FIG. 1. In FIG. 2A, the aperture for hot air 6 opens around the nozzle 3. FIG. 2B shows another form in which a plurality of small apertures for hot air 21 open in a line besides the aperture for hot air 6. FIG. 2C shows still another form in which a plurality of small apertures for hot air 22 are circularly disposed.

These pluralities of small apertures 21, 22 cause the molten filament 4 to vibrate, so that the frictional resistance attributed to the air brought into contact with the molten filament 4 is increased to thereby increase the draft ratio.

Various experiments were conducted by the use of the apparatus shown in FIGS. 1 and 2. With respect to representative ones, Table 1 shows the properties of spun filaments in relation to the experimental conditions (Examples 1 to 5 and Comparative Examples 1 to 3).

TABLE 1

| | Type of polymer | Shape of nozzle | Temp. of resin ° C. | Extrusion rate g/min | Share rate L/sec | Temp. of hot air ° C. | Flow rate of hot air L/min | N50 temp. ° C. | Diam. of filament μ | Draft ratio | as spun strength | Curl ratio mm |
|---|---|---|---|---|---|---|---|---|---|---|---|---|
| Example | | | | | | | | | | | | |
| 1 | a | I | 380 | 6.9 | 4.3 × 10⁴ | 400 | 70 | 259 | 39 | 59 | 3.2 | 6 |
| 2 | a | II | 380 | 1.1 | 2.4 × 10⁴ | 400 | 90 | 298 | 25 | 64 | 4.9 | 1.2 |
| 3 | a | III | 380 | 0.3 | 6.6 × 10³ | 400 | 90 | 298 | 30 | 44 | 4.0 | 2.5 |
| 4 | b | II | 420 | 0.3 | 6.6 × 10³ | 450 | 110 | 345 | 39 | 26 | 4.7 | 8 |
| 5 | c | II | 400 | 0.3 | 6.6 × 10³ | 450 | 110 | 345 | 34 | 34 | 3.2 | 15 |
| Comp. Example | | | | | | | | | | | | |
| 1 | a | II | 380 | 1.1 | 2.4 × 10⁴ | — | 0 | 120 | 185 | 1.2 | 0.7 | 210 |
| 2 | a | II | 380 | 1.1 | 2.4 × 10⁴ | 300 | 90 | 191 | 139 | 2.0 | 2.1 | 87 |
| 3 | a | II | 380 | 0.5 | 5.0 × 10⁴ | — | 0 | 127 | 81 | 1.7 | 2.3 | 170 |

Examples 1 to 5 and Comparative Examples 1 to 3
Production of Filament Assembly

FIG. 1 shows one mode of the process B of the present invention in which a helmet-shaped filament assembly is produced by carrying out heating right under a nozzle with hot air.

Referring to FIG. 1, a melt of thermotropic liquid crystal polymer 1 is quantitatively fed to a spinning apparatus 2 by In Table 1, the column "type of polymer" specifies the type of employed thermotropic liquid crystal polymer as follows:

a: thermotropic liquid crystal polyester being tetracopolyester having repeating units respectively derived from terephthalic acid, isophthalic acid, 4-hydroxybenzoic acid and 4,4'-dihydroxydiphenyl (molar ratio=0.6/0.4/ 2/1) which has a melting point of 350° C. (measured by DSC), b: thermotropic liquid crystal polyester being tercopolyester having repeating units respectively derived from terephthalic acid, 4-hydroxybenzoic acid and 4,4'-dihydroxydiphenyl (molar ratio=1/2/1) which has a melting point of 400° C. (measured by DSC), and c: thermotropic liquid crystal polyester being bicopolyester having repeating units respectively derived from 4-hydroxybenzoic acid and 6-hydroxy-2-naphthoic acid (molar ratio=7/3) which has a melting point of 280° C. (measured by DSC).

The shape of nozzle is as follows:

I: 0.3 mm in nozzle diameter and 0.3 mm in nozzle length (FIG. 2A),

II: 0.2 mm in nozzle diameter and 0.2 mm in nozzle length (FIG. 2B), and

III: 0.12 mm in nozzle diameter and 0.2 mm in nozzle length (FIG. 2A).

The temp. of resin is the temperature of the resin fed from the extruder, and the temperature of the spinning apparatus 2 is set nearly at this temperature.

The extrusion rate (g/min) and the flow rate of hot air (liter/min) are the rates per nozzle. The N50 temp. indicates the temperature of the atmosphere at a position 50 mm under the nozzle.

The as spun strength is the strength of the filament upon spinning thereof in terms of g/d (grams per denier).

In the Table, all the experiments except for Comparative Example 3 were carried out for obtaining a filament assembly. In Comparative Example 3, the spun filament was taken up by a winder while increasing the shear rate and the draft ratio so as to obtain a filament of maximized strength and elastic modulus as in the conventional filament producing experiment. In Comparative Example 3, even if use was made of a nozzle of 0.12 mm, the strength and the draft ratio were 2.3 g/d and 1.7, respectively. In contrast, in Example 2 in which use was made of a nozzle of 0.2 mm in diameter, the strength and the draft ratio increased to 4.9 g/d and 64, respectively.

In the long-term operation, nozzle cloggings are more frequent at 0.12 mm in diameter than at 0.2 mm in diameter by a figure or more.

The filament assembly of Example 1 appearing in Table 1 was photographed at 15 magnifications and observed. As a result, it has been found that the constituent filament assembles each have a diameter of about 25 μm and that the filament curls are distributed from about 5 mm to 50 mm in radii of curvature (0.3 to 3 mm because of 15 magnifications, averaging to give a curl ratio of 1.2 mm).

For comparison, a bundle of 40 5-denier commercially available thermotropic liquid crystal polymer filaments (trade name: Vectran sold by Kuraray Co., Ltd.) (200 denier in total) was loosened to thereby obtain an assembly sample. This was also photographed at 15 magnifications and observed. As a result, it has been found that there is no filament entanglement with most of the filaments being substantially straight, and that the filament bundle loosening is not satisfactory to cause bundled parts to remain. Such unloosened bundled parts of filaments have poor resin infiltration at the use in FRP of FRTP and occasionally invite defects such as taking up of bubbles.

Thus, only assembly of commercially available thermotropic liquid crystal polymer filaments does not lead to satisfactory entanglement. The assembly cannot independently be handled as a whole, and the handling immediately causes configuration collapse. An adhesive may be applied for bonding. However, the use of a heat-resistant adhesive increases the cost. Further, the adhesive gravely degrades the heat resistance and electrical properties of the filaments. The curl ratio of the comparative filaments was 100 mm or more as measured by photographing at less magnification.

Determination of Density

The densities of the filament of Example 1 and a filament produced by the conventional melt spinning method in which the spun filament was simply cooled and wound (use was made of the same thermotropic liquid crystal polymer as in Example 1) were measured by the density gradient tube method. As a result, it has been found that the filament of Example 1 has a density of 1.348 which is about 1% higher than the density of the filament produced by the conventional melt spinning method, 1.371. However, there was no significant difference between the true specific gravities of the filament of Example 1 and the filament produced by the conventional melt spinning method.

Sectional micrographs showed the presence of voids in the filament produced by the conventional melt spinning method but substantially no voids in the filament of Example 1.

Examples 6 to 10 and Comparative Examples 4 to 6

Production of Filament

FIG. 3 shows one mode of the process A of the present invention in which heating right under a nozzle is conducted with hot air.

Referring to FIG. 3, a melt of thermotropic liquid crystal polymer 1 is quantitatively fed to a spinning apparatus 2 by means of an extruder and a gear pump (both not shown). A molten filament 4 is extruded through a nozzle 3. Hot air of high pressure 5 is fed to the spinning apparatus 2 and blown through an aperture 6 provided in close vicinity to the nozzle along the filament 4. Even if hot air is blown, it catches up cold air therearound to thereby become 40 to 50° C. air several tens of millimeters under the nozzle. Thus, the melt is solidified to become a filament 7, which is taken up around a winder 51.

FIG. 2 is a view of a lower side of the spinning apparatus 2 shown in FIG. 3.

Various experiments were conducted by the use of the apparatus shown in FIGS. 3 and 2. With respect to representative ones, Table 2 shows the properties of spun filaments in relation to the experimental conditions (Examples 6 to 10 and Comparative Examples 4 to 6).

TABLE 2

|  | Type of polymer | Shape of nozzle | Temp. of resin ° C. | Extrusion rate g/min | Share rate L/sec | Temp. of hot air ° C. | Flow rate of hot air L/min | N50 temp. ° C. | Diam. of filament μ | Draft ratio | as spun strength |
|---|---|---|---|---|---|---|---|---|---|---|---|
| Example |  |  |  |  |  |  |  |  |  |  |  |
| 6 | a | I | 380 | 6.9 | 4.3 × 10⁴ | 400 | 20 | 235 | 37 | 67 | 3.5 |
| 7 | a | II | 380 | 1.1 | 2.4 × 10⁴ | 400 | 20 | 272 | 22 | 83 | 5.2 |

TABLE 2-continued

|  | Type of polymer | Shape of nozzle | Temp. of resin °C. | Extrusion rate g/min | Share rate L/sec | Temp. of hot air °C. | Flow rate of hot air L/min | N50 temp. °C. | Diam. of filament μ | Draft ratio | as spun strength |
|---|---|---|---|---|---|---|---|---|---|---|---|
| 8 | a | II | 380 | 0.3 | $6.6 \times 10^3$ | 400 | 20 | 272 | 26 | 59 | 4.1 |
| 9 | b | II | 420 | 0.3 | $6.6 \times 10^3$ | 450 | 20 | 316 | 34 | 34 | 4.8 |
| 10 | c | II | 400 | 0.3 | $6.6 \times 10^3$ | 450 | 20 | 316 | 31 | 42 | 3.7 |
| Comp. Example |  |  |  |  |  |  |  |  |  |  |  |
| 4 | a | II | 380 | 1.1 | $2.4 \times 10^4$ | — | 0 | 120 | 120 | 2.8 | 1.8 |
| 5 | a | II | 380 | 1.1 | $2.4 \times 10^4$ | 300 | 20 | 191 | 85 | 5.5 | 2.1 |
| 6 | a | II | 380 | 0.5 | $5.0 \times 10^4$ | — | 0 | 127 | 81 | 1.7 | 2.3 |

In Table 2, the types of polymers and the conditions such as the shape of nozzle are the same as employed in Table 1.

Figure 4:
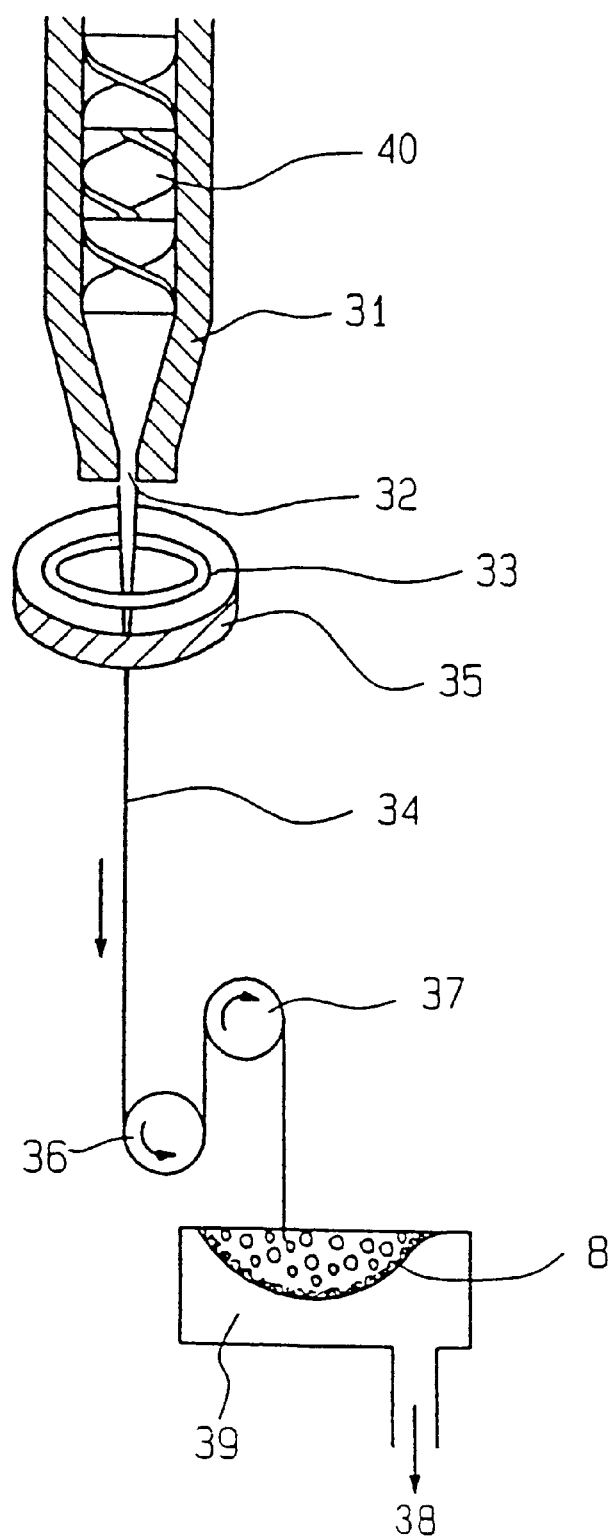
FIG. 4 is a view of one form of spinning apparatus adapted to heat a molten filament 34 under a nozzle 32 of a spinning machine 31 by means of an infrared heater 33.

FIG. 4 shows another mode of the process B of the present invention in which a molten filament 34 is heated under a nozzle 32 of a spinning machine 31 by means of an infrared heater 33. A reflector 35 is disposed around the infrared heater 33 in order to improve the heating efficiency.

The filament 34 is taken up by driven rollers 36, 37 and piled on a helmet-shaped mold 8 to thereby produce a filament assembly 9. In this process, a negative pressure chamber 39 may be provided on the back of the mold 8 by suctioning air 38 so that a filament assembly 9 having high density is produced.

A static mixer 40 may be disposed in the spinning machine 31, so that the temperature is uniformed in the extruder and the spinning machine 31 to thereby ensure extrusion at uniform temperature. As a result, the shear rate can be increased, and a high draft ratio can be realized. Thus, the quality of the filament assembly is improved and stabilized.

Figure 5:
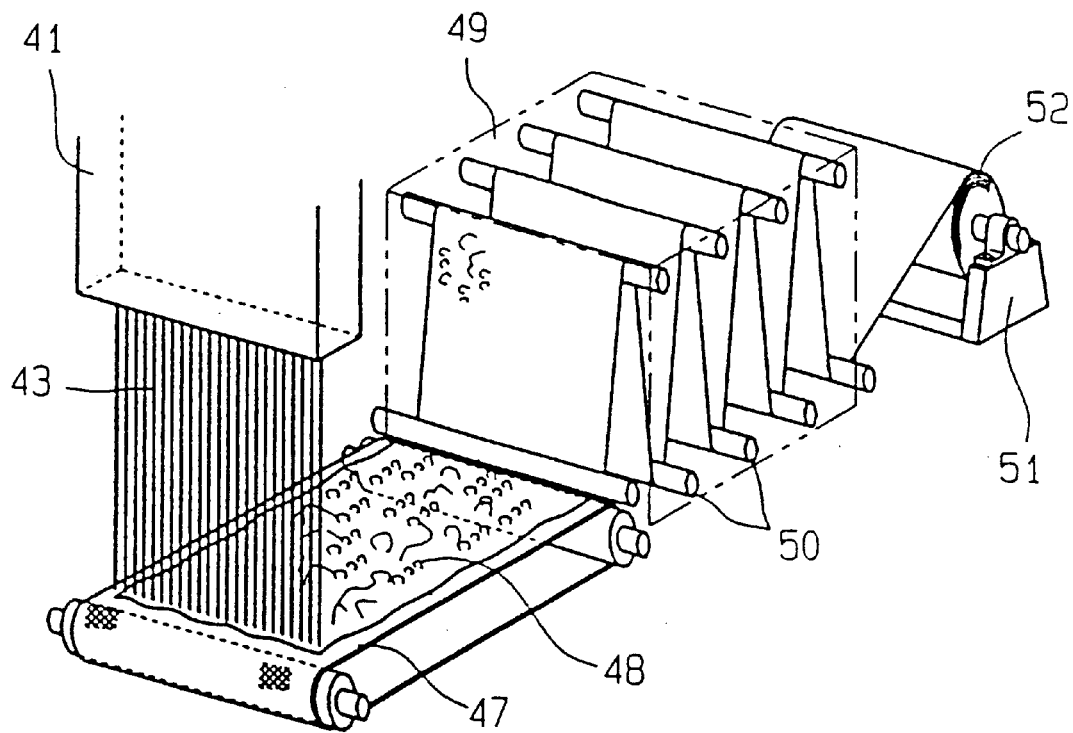
FIG. 5 is a view showing one mode of process for producing a filament assembly in the form of a nonwoven web with the use of a die for melt blow nonwoven-fabric production.

FIG. 5 shows one mode of the process B of the present invention in which a filament assembly in the form of a nonwoven web is produced with the use of a die for melt blow nonwoven-web production.

Filaments 43 are extruded through a vast plurality of minute apertures 42 of the melt blow die 41, and hot air 46 is blown through slits 44, 45 provided on both sides of each of the minute apertures.

The filaments 43 are drafted by the frictional force attributed to the velocity of hot air to thereby orient the molecules and entangled and piled on a conveyor belt 47 as a filament assembly 48 in the form of a nonwoven web by the power of the hot air.

The filament assembly 48 is carried by the traveling conveyor belt 47 and passed through a vast plurality of turn rolls 50 while gaining time in a heat treatment chamber 49 in which hot air is circulated. The resultant heat treated filament assembly 52 is taken up by a winder 51.

When the entanglement of the filaments is poor in the filament assembly which has exited the conveyor belt 47, the integration thereof may be promoted by needle punching or by the use of a heat-resistant adhesive (e.g., ceramic adhesive).

Figures 6A, 6B:
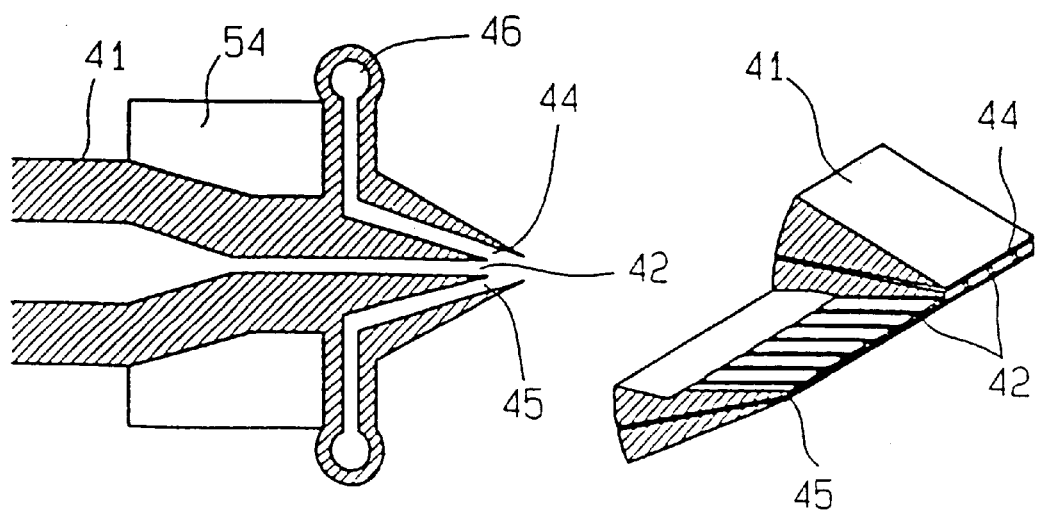
FIG. 6 shows a view of a section (FIG. 6A) and a view of an inner structure (FIG. 6B) of the melt blow die of FIG. 5.

FIG. 6 shows a section of the melt blow die (FIG. 6A) and an inner structure thereof (FIG. 2B). The die is heated by a heating block 53.

FIG. 7 shows one form of the structure of the nozzle part 42 of the conventional melt blow die of FIG. 6, in which the nozzle diameter is 0.5 mm with the ratio of nozzle length (L) to nozzle diameter (D), L/D, being 10. This nozzle is extremely unsuitable for the spinning of the thermotropic liquid crystal polymer filament.

FIG. 8 shows one form of the structure of the nozzle part of the melt blow die which is suitable for use in the present invention. The nozzle diameter is 0.15 mm and L/D is 2.

In the conventional production of a melt blow nonwoven web of polypropylene or polyesters, use is made of a die having a spinning nozzle diameter of about 0.5 mm for resisting the draft force by high-velocity air. When the diameter is smaller, breakages at the nozzle become frequent and the occurrence of shot is increased, so that a nonwoven web of high quality cannot be obtained. In the conventional melt blow die, L/D is generally about 10 taking into account the linearity and mechanical pressure resistance of the spun filament. The strength of the filaments composing the melt blown nonwoven web of polypropylene or polyesters produced with the use of the above conventional die is nearly entirely nil, 0.5 g/d or less at the best.

In the spinning of the nonwoven web of TLCP according to the present invention, however, the strength of the extruded filament is as high as 2.5 g/d or greater, so that, even if the spinning nozzle diameter is small, breakages at the nozzle is less frequent. As a result of various experiments, it has been found that it is preferred that the nozzle diameter be 0.3 mm or less, preferably 0.2 mm or less and still preferably 0.15 mm or less. When the nozzle diameter is too small, cloggings become frequent to disadvantage in practice. Therefore, the nozzle diameter is generally not smaller than 0.005 mm.

With respect to the nozzle for use in the present invention, the smaller the value of L/D, the less frequent the filament breakage, with the result that a nonwoven web of high-quality filaments is obtained. However, rendering the value of L/D 0.1 or less is difficult from the viewpoint of the pressure resistance of the spinning machine. As a result of various experiments, it has been found that it is preferred that L/D be 5 or less and preferably 3 or less.

Figure 9:
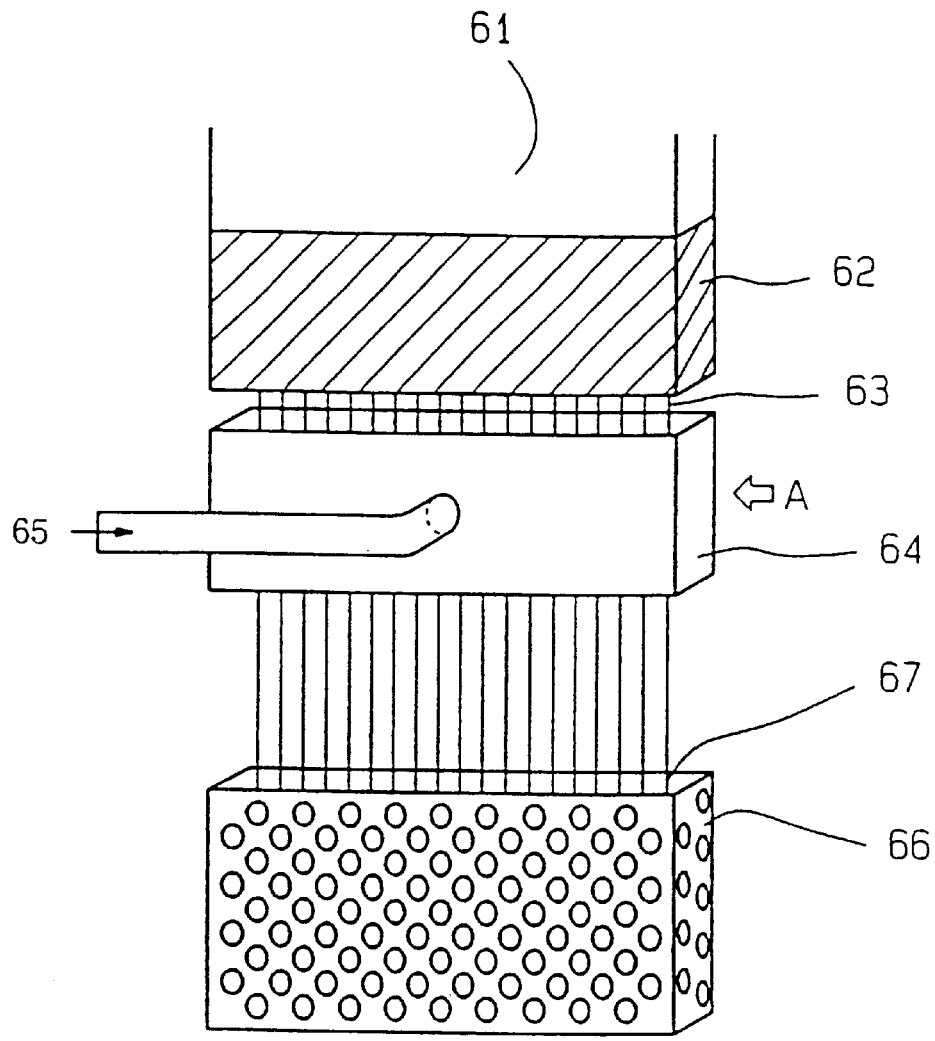
FIG. 9 is a view of an apparatus provided with a heat insulating mold 62 and a ventilative box 66 under a die for spun bonded nonwoven web production 61, which shows another mode of the process of the present invention.
Figure 10:
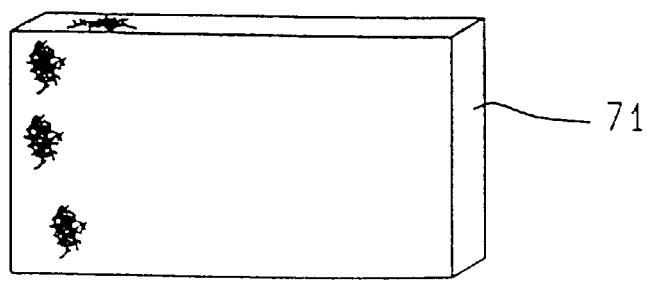
FIG. 10 is a view of a filament assembly separated from the box 66 of FIG. 7.
Figure 11:
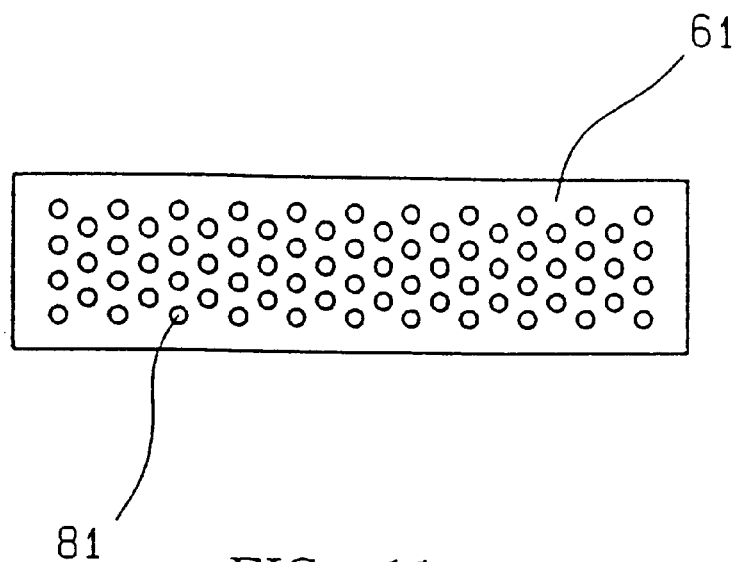
FIG. 11 is a view of a lower side of the spun bonding die 61 of FIG. 7.

FIGS. 9 to 11 show another mode of the process D of the present invention in which a heat insulating mold 62 is disposed under a die for spun bonded nonwoven web production 61, and in which a filament 63 extruded through the die 61 is not cooled by virtue of the heat insulating mold, taken up by an air 65 of a suction box 64 and piled in a ventilative box 66 to thereby obtain a filament assembly 67. In the filament assembly 67, the filaments are mutually entangled by the power of the air. When the entanglement is not satisfactory, the integration of the filament assembly can be strengthened with the use of, for example, a heat-resistant adhesive (e.g., ceramic adhesive).

The box 66 is ventilative, so that it can be brought as it is into a hot air circulating chamber for heat treatment. Then, a heat-treated filament assembly 71 (FIG. 10) is separated from the box. The filament assembly 71 is used, as it is or after rework, as an adiabatic filter, an adiabatic mat or the like.

The heat insulating mold 62 is one composed of a lower part of the spun bond die 61 surrounded with an adiabatic material. Preferably, the heat insulating mold 62 per se is positively heated with a heater.

FIG. 11 is a view of a lower side of the spun bond die 61. There are a vast plurality of nozzles 81, and they are not arranged in a line as different from the melt blow die. This is advantageous from the viewpoint that the number of nozzles can be increased to improve productivity. The conventional die for spinning synthetic polypropylene or polyethylene terephthalate multifilaments may be used as the above die.

Figure 12:
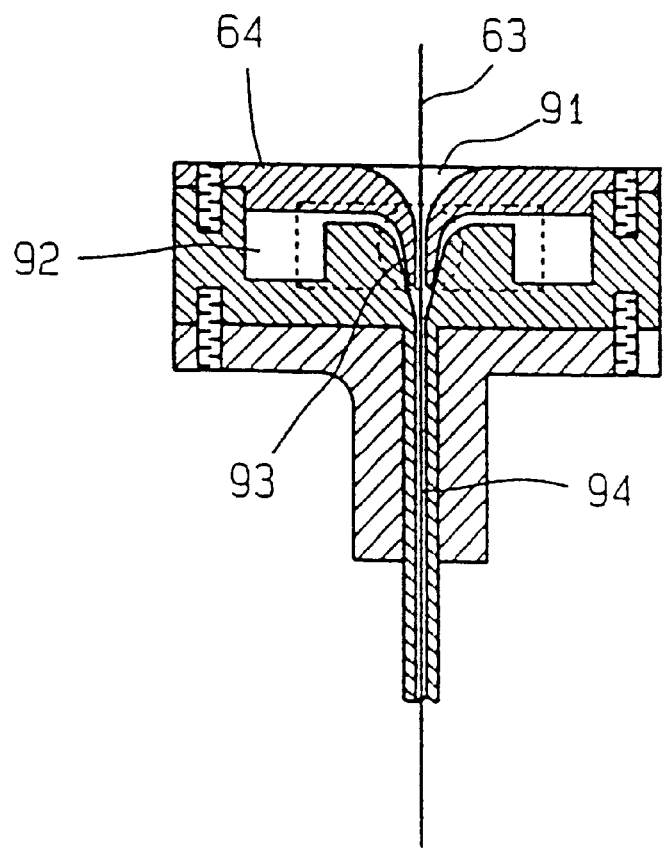
FIG. 12 is a view of a section of a suction box 64 of FIG. 7 as observed along the direction A of FIG. 8.

FIG. 12 is a view of a section of the suction box 64 as observed along the direction A of FIG. 9. The thermotropic liquid crystal polymer filament 63 introduced through an inlet 91 is speedily drawn in a slit 94 by an air 65 having its pressure uniformed in an air reservoir 92 and having speeded up in an air slit 93. Thus, the filament undergoes a molecular orientation.

Examples 11 to 15

Production of Filament Assembly

Figure 13:
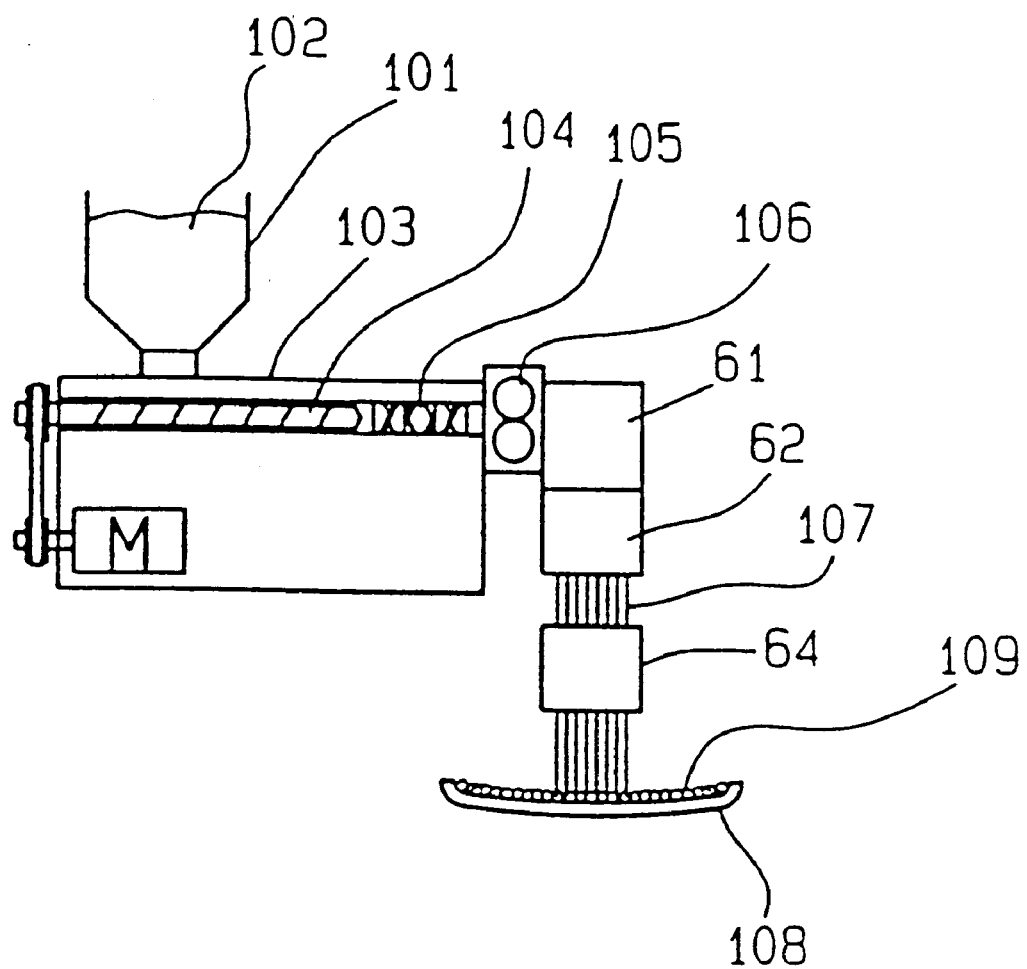
FIG. 13 is a view of one form of apparatus for use in co-extruding a thermotropic liquid crystal polymer and an extrudable non-liquid-crystalline polymer to thereby produce one form of filament.

FIG. 13 shows one mode of the process D of the present invention, in which a thermotropic liquid crystal polymer and extrudable non-liquid-crystalline polymer are mixed together and extruded to thereby mix the thermotropic liquid crystal polymer and the extrudable non-liquid-crystalline polymer into a filament. Pellets 102 composed of a thermotropic liquid crystal polymer mixed with an extrudable non-liquid-crystalline polymer in a given ratio are stocked in a hopper 101 (preferably drying hopper 101).

The pellets 102 are kneaded by means of a screw 104 in an extruder 103, further mixed by means of a static mixer 105 and fed to a spun bond die 61 by means of a gear pump 106. A filament 107 spun by the spun bond die 61 is carried through a heat insulating mold 62 and a suction box 64 disposed under the die and piled on an automobile bumper mold 108 in the form of an assembly 109 of the filament composed of the thermotropic liquid crystal polymer mixed with the extrudable non-liquid-crystalline polymer.

The extrusion rate is maximized so as for the shear rate to be high at the nozzle 81 (FIG. 11) of the spun bond die 61, thereby improving the molecular orientation of the thermotropic liquid crystal polymer part.

A matrix having, for example, a filler and a foaming agent mixed thereinto may be added to the filament assembly 109 accommodated in the mold 108 and heated to thereby carry out both of heat treatment of the thermotropic liquid crystal polymer and molding of the bumper.

FIG. 17D shows a section of the filament composing the filament assembly 109. It is apparent therefrom that the thermotropic liquid crystal polymer having undergone a high molecular orientation is dispersed in the extrudable non-liquid-crystalline polymer.

The results of mix spinning experiments conducted with the use of the apparatus of FIG. 13 are shown in Table 3 (Examples 11 to 15).

The nozzle diameter was 0.3 mm and the land length 2 mm, and 400 nozzles were provided.

The same type of thermotropic liquid crystal polymer as in Table 1 was employed, and the types of employed extrudable non-liquid-crystalline polymers were as follows:

p: polypropylene MFR 0.4 g/10 min n: maleic acid-modified polyethylene MFR 1.0 g/10 min (1% by weight of maleic anhydride was added to high density polyethylene)

t: PET resin (polyethylene terephthalate)

The extrusion rate is expressed by g/min per nozzle.

Provided that q, fo and fe are respectively defined as the mixing ratio of thermotropic liquid crystal polymer, the as spun strength of mixed filament and the strength of the filament obtained by spinning the extrudable non-liquid-crystalline polymer only under the same conditions, the strength of the thermotropic liquid crystal polymer filament only, fs, satisfies the following equality:

$$fs=\{fo-fe(1-q)\}/q.$$

Table 2 demonstrates that all the shear rate, the draft ratio and the fs strength are improved by the mixing of the extrudable non-liquid-crystalline polymer.

Examples 16 to 20

Production of Filament

FIG. 13 shows one mode of the process C of the present invention, in which a thermotropic liquid crystal polymer and a non-liquid-crystalline polymer are mixed together and extruded. The employed apparatus is similar to that of FIG. 13. Pellets composed of a thermotropic liquid crystal polymer mixed with a non-liquid-crystalline polymer in a given ratio are stocked in a hopper, kneaded by means of a screw in an extruder, further mixed by means of a static mixer and fed to a die by means of a gear pump.

Although the spun bond die of FIG. 11 was used as the above die, it is not critical and other general dies for use in the melt spinning of, for example, polyethylene terephthalate or polypropylene may be used. The filament extruded through the die 10 is taken up at a given rate by a winder.

The results of mix spinning are shown in Table 4 (Examples 16 to 20).

TABLE 3

| Example | TLCP Type of polymer | % | EP Type of polymer | Temp. of resin °C. | Extrusion rate g/min | Share rate L/sec | Diam. of filament μ | Draft ratio | as spun strength |
|---|---|---|---|---|---|---|---|---|---|
| 11 | c | 50 | t | 380 | 250 | $1.5 \times 10^6$ | 31 | 94 | 4.7 |
| 12 | c | 75 | n | 380 | 34 | $2.2 \times 10^5$ | 37 | 66 | 4.5 |
| 13 | c | 25 | p | 380 | 41 | $2.5 \times 10^5$ | 23 | 170 | 4.9 |
| 14 | c | 75 | n | 400 | 70 | $4.4 \times 10^5$ | 55 | 33 | 4.7 |
| 15 | c | 25 | t | 350 | 36 | $2.2 \times 10^5$ | 42 | 51 | 3.2 |

TLCP: thermotropic liquid crystal polymer
EP: extrudable non-liquid-crystalline polymer

TABLE 4

| Example | TLCP Type of polymer | % | EP Type of polymer | Temp. of resin °C. | Extrusion rate g/min | Share rate L/sec | Diam. of filament μ | Draft ratio | as spun strength fs |
|---|---|---|---|---|---|---|---|---|---|
| 16 | a | 50 | t | 380 | 250 | $1.5 \times 10^6$ | 27 | 123 | 5.2 |
| 17 | a | 75 | n | 380 | 34 | $2.2 \times 10^5$ | 35 | 73 | 4.8 |
| 18 | a | 25 | p | 380 | 41 | $2.5 \times 10^5$ | 22 | 185 | 5.1 |
| 19 | c | 75 | n | 400 | 70 | $4.4 \times 10^5$ | 51 | 35 | 5.0 |
| 20 | c | 25 | t | 350 | 36 | $2.2 \times 10^5$ | 39 | 59 | 3.8 |

TLCP: thermotropic liquid crystal polymer
EP: extrudable non-liquid-crystalline polymer In Table 4, the types of polymers and the conditions such as the shape of nozzle are the same as employed in Table 3.

Figure 14:
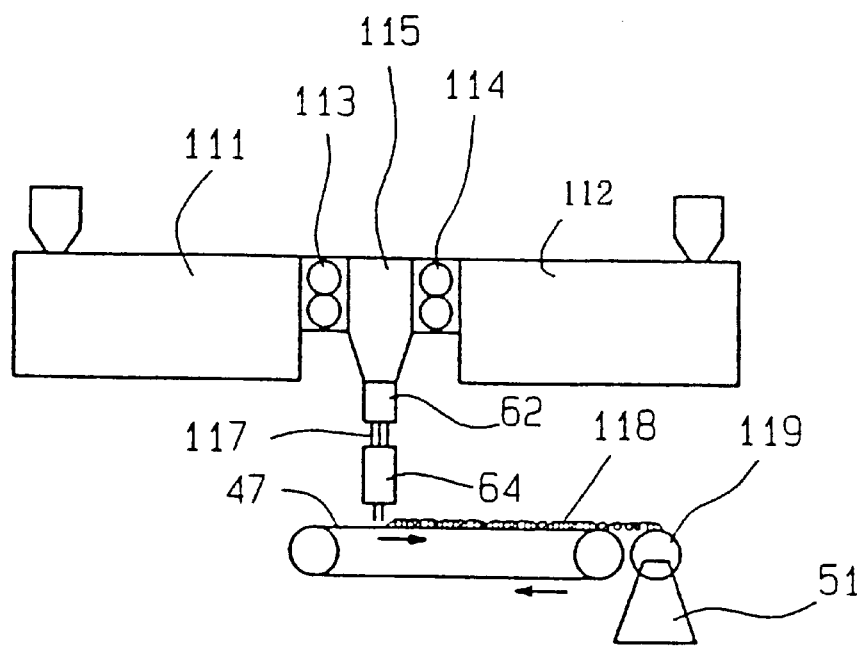
FIG. 14 is a view of one form of apparatus for use in extruding a thermotropic liquid crystal polymer and an extrudable non-liquid-crystalline polymer to thereby produce one form of filament by the use of two extruders.
Figure 15:
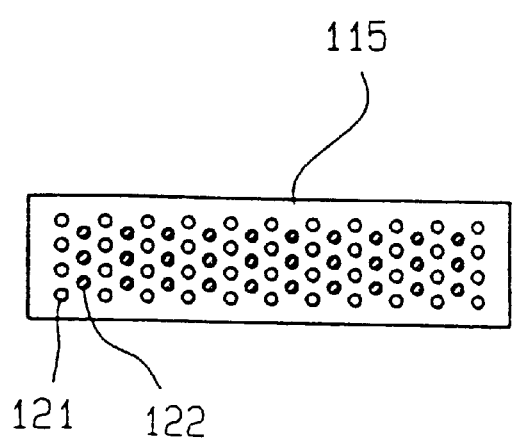
FIG. 15 is a view of an upper side of an extrusion die 115 of FIG. 14.

FIGS. 14 and 15 show one mode in which two extruders are employed. An extruder 111 extrudes a thermotropic liquid crystal polymer while an extruder 112 extrudes an extrudable non-liquid-crystalline polymer. Both are fed by means of gear pumps 113, 114 into a spun bond die 115. The two resins are separately extruded through respective nozzles 121, 122. As in FIG. 9, a filament 117 having exited the die 115 is passed through a heat insulating mold 62 to reserve heat, drawn through a suction box 64, piled on a conveyor belt 47 as a filament assembly 118 and taken up around a winder 51 as a filament assembly 119 in the form of a nonwoven web.

Examples 21 to 23
Production of Filament Assembly

Examples 21 to 23 of Table 5 show particular nonwoven webs having high draft ratios realized by mix spinning.

Experiments were conducted with the use of the melt blow die of FIG. 8. Mix spinning is effective in increasing the draft ratio.

TABLE 5

| Example | TLCP Type of polymer | % | EP Type of polymer | Temp. of resin °C. | hot air temp. °C. | hot air flow rate L/min | Diam. of filament μ | Draft ratio | as spun strength |
|---|---|---|---|---|---|---|---|---|---|
| 21 | a | 90 | t | 380 | 400 | 30 | 16 | 88 | 5.1 |
| 22 | a | 90 | p | 380 | 400 | 30 | 13 | 133 | 5.4 |
| 23 | a | 75 | p | 380 | 400 | 30 | 9 | 278 | 4.5 |

TLCP: thermotropic liquid crystal polymer
EP: extrudable non-liquid-crystalline polymer Examples 24 to 28 and Comparative Example 7
Production of Filament Examples 24 to 28 of Table 6 show particular nonwoven webs having high draft ratios realized by mix spinning.

Experiments were conducted with the use of the melt blow die of FIG. 8. While the spinning of TLCP only resulted in a draft ratio of 21 (Comparative Example 7), it is easy to attain a draft ratio of 50 or higher by the spinning of a mixture with EP under the same conditions and further to attain a draft ratio of 100 or higher by conducting the above mix spinning with the use of hot air.

TABLE 6

| Example- Comp. Ex. | TLCP Type of polymer | % | EP Type of polymer | Temp. of resin °C. | hot air temp. °C. | hot air flow rate L/min | Diam. of filament μ | Draft ratio | as spun strength |
|---|---|---|---|---|---|---|---|---|---|
| Example 24 | a | 90 | t | 380 | 400 | 30 | 13 | 133 | 5.5 |
| Example 25 | a | 90 | p | 380 | 400 | 30 | 11 | 185 | 6.1 |
| Example 26 | a | 75 | p | 380 | 400 | 30 | 8 | 354 | 8.2 |
| Example 27 | a | 75 | p | 380 | — | — | 17 | 78 | 4.1 |

TABLE 6-continued

| Example- Comp. Ex. | TLCP | | EP | Temp. of resin °C. | hot air | | Diam. of filament μ | Draft ratio | as spun strength |
|---|---|---|---|---|---|---|---|---|---|
| | Type of polymer | % | Type of polymer | | temp. °C. | flow rate L/min | | | |
| Example 28 | a | 75 | t | 380 | — | — | 20 | 56 | 3.8 |
| Comp. Ex. 7 | a | 100 | — | 380 | — | — | 33 | 21 | 2.4 |

TLCP: thermotropic liquid crystal polymer
EP: extrudable non-liquid-crystalline polymer The reason why a high draft ratio can be attained by mix spinning of EP and TLCP is as follows. EP and TLCP are mixed together at the stock stage and further kneaded together in the extruder. The shear force in the nozzle and the draft activity outside the nozzle force the EP toward the surface of the filament, thereby naturally forming a filament structure in which TLCP composes the core while the EP composes the sheath. The presence of the EP at the surface prevents the TLCP from forming a skin at the surface, thereby realizing a high draft ratio. In this connection, the core-forming TLCP has been dissolved away with an alkali solution from the filament obtained in Example 12 with the use of polypropylene as the EP, and subsequent microscopic observation has clearly showed the remaining of only the sheath of polypropylene.

In particular, the obtained filament was immersed in a hot aqueous solution of sodium hydroxide overnight, filtered and washed with water. Subsequent observation by an electron microscope clearly showed the filament with a hollow structure in which only the sheath remained undissolved.

That the thus observed filament was nearly completely composed of polypropylene was confirmed by a composition analysis. Further, as a result of separately conducted tests, it has been confirmed that, while TLCP is readily dissolved in an aqueous alkali solution without leaving any solid, polypropylene is nearly insoluble in the solution to remain as a solid.

In the above process, referring to FIG. 15 showing a view of a lower side of the spun bond die 115, the separate extrusions of the thermotropic liquid crystal polymer through nozzles 121 indicated by circles in the figure and the extrudable non-liquid-crystalline polymer through nozzles 122 indicated by hatched circles in the figure results in the formation of the filament assembly 119 of FIG. 14 which is composed of a mixture of two filaments, i.e., those of the thermotropic liquid crystal polymer and the extrudable non-liquid-crystalline polymer.

A composite (bicomponent or mulchcomponent) filament having a core-sheath structure (or side-by-side structure) can be spun by the use of two extruders. Examples of the composite filaments each having a core-sheath structure are shown in FIG. 16. If this structure is adopted and if use is made of polypropylene or polyesters exhibiting high surface draft properties, the formation of a skin of TLCP at the surface can be prevented to attain a high draft ratio.

Various types of nozzles for use in the production of synthetic fine denier filaments may be employed in the present invention. As shown in FIG. 17, the inner structure of each filament may be a sectional structure like islands being scattered in a sea (FIG. 17A), a split structure (FIG. 17B) or a multilayer structure (FIG. 17C), in which the hatched part is formed by extruding the thermotropic liquid crystal polymer while the other part is formed by extruding the extrudable non-liquid-crystalline polymer (the polymers may be exchanged). In the conventional process for obtaining fine denier for use in, for example, synthetic leathers, drawing is performed prior to splitting or removal of unneeded resins. With respect to the thermotropic liquid crystal polymer filament of the present invention, drawing is not needed. It can be realized that the resins other than the thermotropic liquid crystal polymer filament may be matrix resins for use in FRP or FRTP or polymers compatible therewith, the thermotropic liquid crystal polymer being highly miscible, from the viewpoint of filament units, with the extrudable non-liquid-crystalline polymer, and that a high shear rate is applicable to the thermotropic liquid crystal polymer filament.

FIG. 17D shows the filament obtained by the process shown in FIG. 13 for comparison.

In FIGS. 17B to 17D, the thermotropic liquid crystal polymer components constitute modified cross sections.

Figure 18:
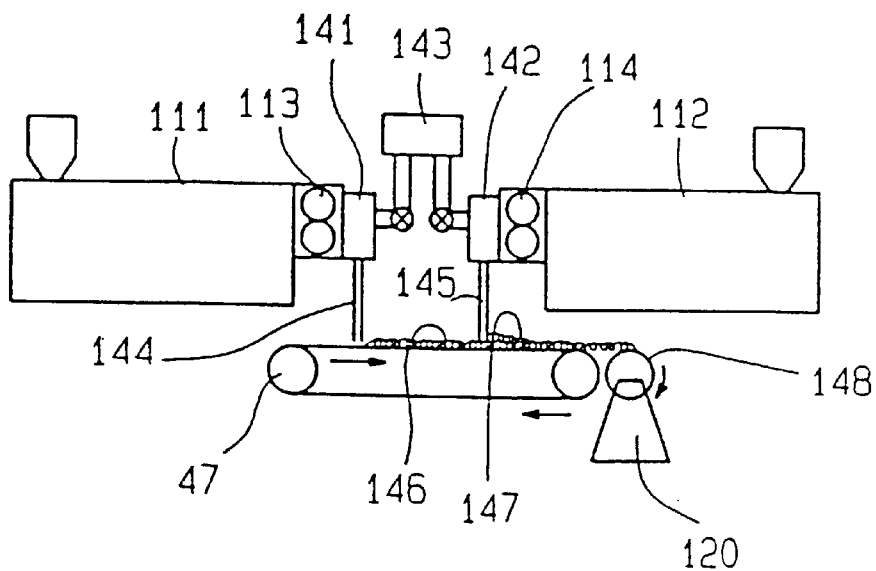
FIG. 18 is a view of another form of apparatus for use in extruding a thermotropic liquid crystal polymer and an extrudable non-liquid-crystalline polymer to thereby produce one form of filament by the use of two extruders.

In FIG. 18, use is made of an extruder 111 for the thermotropic liquid crystal polymer and an extruder 112 for the extrudable non-liquid-crystalline polymer as in FIG. 14. The extruders 111, 112 are provided with melt blow dies 141, 142, respectively. Separate filaments 144, 145 are piled on a conveyor 47 with the use of hot air generated by a hot air generator 143. An assembly 148 composed of a laminate of a filament assembly of thermotropic liquid crystal polymer 156 and a filament assembly of extrudable non-liquid-crystalline polymer 147 is taken up by a winder 51.

FIG. 18 shows a laminate in which each filament assembly forms one layer. Instead, an increased number of melt blow dies may be disposed so that thermotropic liquid crystal polymer layers and extrudable non-liquid-crystalline polymer layers are piled one upon another to thereby improve the productivity and the miscibility.

In FIG. 18, only the melt blow dies are employed. This is not critical, and the spun bond and combination dies may also be utilized.

The inventors formerly proposed nonwoven webs of arranged filaments (Japanese Patent Laid-Open Gazette No. 148861/1989 and U.S. Pat. No. 5,312,500).

Figures 19A, 19B:
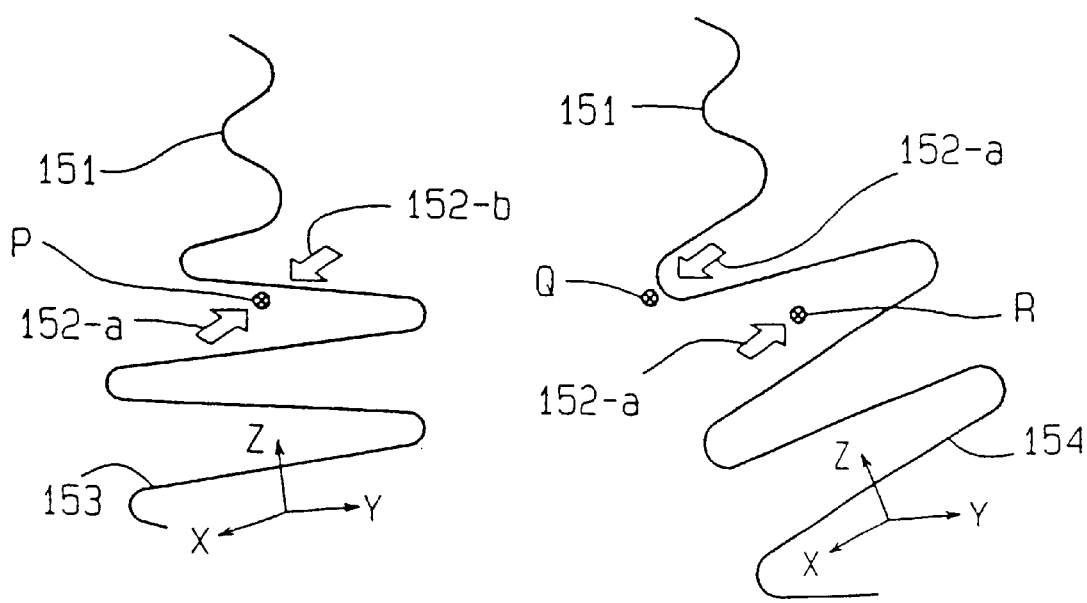
FIG. 19 is a view of a filament with which secondary air is colliding and crossing.

The inventors found that the extrusion of the molten filament through the nozzle 6 and the blowing of hot air (primary hot air) through the apertures 21, 22 provided in close vicinity to the nozzle with the use of the die B or C of FIG. 2 cause the filament 151 in FIG. 19 to vibrate (frequency on the order of 1/100 sec as actually measured by a high-speed video camera), and that the application of secondary air 152-a, 152-b so as to collide (FIG. 19A) or cross (FIG. 19B) therewith arranges the filaments 153, 154 in the direction X in FIG. 19A and in the direction Y in FIG. 19B. This principle applies to the thermotropic liquid crystal polymer filament of the present invention. In particular, the thus arranged nonwoven web is highly advantageous because the thermotropic liquid crystal polymer filament can attain high strength and high elastic modulus without drawing. That is, a product excellent in strength and elastic modulus as a whole body of shaped article can be obtained by the joint application of the effect of the arrangement in the production of the filament assembly of high strength and high elastic modulus according to the present invention.

The method for vibrating the molten filament 151 is not limited to the above use of primary hot air and includes the mechanical and electrical methods described in U.S. Pat. No. 5,312,500.

FIG. 20 is a schematic view of the nonwoven web arranged according to the present invention, in which the filaments are arranged along the direction of the arrow. The arrangement of the filaments is not complete as different from the prepreg or the like. It is satisfactory in the present invention that, with respect to all the flexed or curled filaments, 60 to 80% are arranged along a given direction.

Figure 20A:
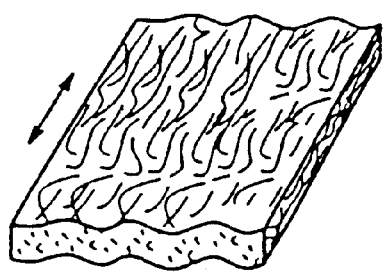
FIG. 20 is a schematic view of a nonwoven web arranged according to the present invention.
Figure 20B:
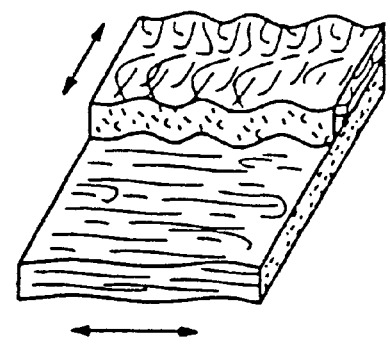

FIG. 20A shows one form of filament assembly arranged along one direction, and FIG. 20B one form of laminate in which the arrangement directions cross with each other.

Although a vast plurality of nozzles are required for obtaining the arranged filament assembly in the form of a nonwoven web product, in the production of a helmet-shaped assembly as shown in FIG. 1, only one nozzle may be used for obtaining a shaped article of a laminate composed of a plurality of layers arranged in arbitrary directions. This can be performed by changing the direction of disposing the helmet mold along the arrangement.

INDUSTRIAL APPLICABILITY

The productivity of the thermotropic liquid crystal polymer filament according to the present invention is high because end breakages do not occur at the stage of spinning, so that the filament is obtained at a lowered cost.

The assembly of thermotropic liquid crystal polymer filaments produced according to the present invention has a strength and handlability as a whole of filament assembly because of the entanglement of the filaments. These effects cannot be achieved by the simple assembly of the conventional spun and bundled thermotropic liquid crystal polymer filaments.

The thermotropic liquid crystal polymer filament composing the filament assembly of the present invention is a continuous long fiber and has high strength and high elastic modulus, thereby ensuring a product of high quality.

The assembly having any desired shape is directly obtained in the stage of spinning. Thus, the process is simplified, so that the cost is lower than in the formation thereof from the conventional filaments.

The filament composing the assembly has high strength and high elastic modulus, which are further improved by heat treatment. Thus, FRP or FRTP of high strength and high elastic modulus can be obtained therefrom. In particular, this assembly is composed of a continuous filament, so that the properties of the filament are fully utilized effectively. This assembly satisfactorily reinforces FRP or FRTP even if the amount thereof is 1/3 to 1/5 of that used when a commercially available filament is chopped and chopped strands are blended with a resin and shaped.

The thermotropic liquid crystal polymer filament of the present invention is excellent in elastic modulus and has not only heat resistance but also solvent resistance, high electrical insulating properties, dimensional stability attributed to low expansion coefficient, incombustibility and flame retardancy. Therefore, the thermotropic liquid crystal polymer filament may be formed as it is without heat treatment into a filter or a heat insulator.

The filament assembly of the present invention may be used as reinforcing filaments for use in BMC or SMC, as a substitute for asbestos for use in brakes, as a heat insulating material, in a shaped article such as a helmet, a container for high-voltage transformer and an automobile bumper and as an independent shaped item such as a filter, a heat insulator, a plate or a pipe.

Further, the filament assembly not only may be used as a heat-resistant highly strong nonwoven web in the form of a continuous rolled nonwoven web but also may be integrated with a matrix resin to use as a material for sheet molding or stampable sheet.

Still further, the filament assembly may be used in electrical and transmission parts and in parts for automobiles, marine vessels and aircrafts because of its high electrical insulation, heat resistance and flame retardation.

Still further, the filament assembly may be used as a buffer material for holding an object to be heated at the time of induction hardening and dielectric heating because the induction and dielectric properties of the thermotropic liquid crystal polymer filament are excellent.

Mechanical entangling means such as needle punch, stitch bond and water jet and chemical entangling means with an adhesive may be applied to the filament assembly of the present invention in order to improve the entanglement of the filaments.

Ceramic adhesives requiring high temperature and time in curing are occasionally especially suitable because the curing of the ceramic and the heat treatment of the thermotropic liquid crystal polymer may be conducted simultaneously.

When the filament of a mixture of a thermotropic liquid crystal polymer and an extrudable non-liquid-crystalline polymer according to the present invention is incorporated in FTP or FRTP, the quality thereof is excellent because the thermotropic liquid crystal polymer is highly miscible with a matrix resin from the viewpoint of filament units and because the filament is a long fiber. Further, the product can be produced at a lowered cost because the cost of the filament assembly is low and because the amount of the thermotropic liquid crystal polymer can be reduced (effect of uniform mixing, effect of long fiber, effect of high molecular orientation in thermotropic liquid crystal polymer, etc.).

With respect to the filament assembly composed of a thermotropic liquid crystal polymer and an extrudable non-liquid-crystalline polymer according to the present invention, the employment of a polymer having adherence to concrete cement (epoxy resin, vinyl acetate resin, etc.) as the extrudable non-liquid-crystalline polymer component renders the filament assembly useful in concrete reinforcement.

FRTP having the filament assembly of thermotropic liquid crystal polymer according to the present invention incorporated therein is entirely composed of thermoplastic polymers and can be recycled. Therefore, and further because it is lightweight and strong, the FRTP would be a material most suitable for use in automobile and electrical parts which are exposed to increasingly strict environmental requirements.

What is claimed is:

1. A filament assembly comprising a plurality of mutually entangled long-fiber filaments of a thermotropic liquid crystal polymer wherein each of the filaments is flexed or curled and has an average radius of curvature of 50 mm or less.

2. The filament assembly as claimed in claim 1, wherein each of the filaments has a core-sheath structure in which the non-liquid-crystalline polymer forms the sheath while the thermotropic liquid crystal polymer forms the core.

3. The filament assembly as claimed in claim 1, wherein each the tensile strength of the filaments before heat treatment thereof is at least 2.5 g/d.

4. The filament assembly as claimed in claim 1, wherein each diameter of the filaments is 30 um or less.

5. The filament assembly as claimed in claim 1, obtained by the process comprising melt spinning a thermotropic liquid crystal polymer through a spinning nozzle at a draft ratio of at least 30 while holding the filament spun right under the spinning nozzle at a high temperature, wherein the temperature at a point 50 mm under said nozzle is the melting point of said thermotropic liquid crystal polymer minus 150° C. or higher.

6. The filament assembly as claimed in claim 1, wherein the filament assembly can be handled as an integrated body by entanglement of the filaments.

7. The filament assembly as claimed in claim 1, wherein each of the filaments consist of a thermotropic liquid crystal polymer, at least one fibrous reinforcement and at least one additive selected from the group consisting of an antioxidant, a heat stabilizer, an ultraviolet absorber, a lubricant, a mold releasing agent, a dye, colorants, a flame retarder, a plasticizer and an antistatic agent.

* * * * *